(12) United States Patent
Pan et al.

(10) Patent No.: US 11,199,765 B2
(45) Date of Patent: Dec. 14, 2021

(54) ILLUMINATION SYSTEM, PROJECTION DEVICE AND OPERATING METHOD THEREOF

(71) Applicant: Coretronic Corporation, Hsin-Chu (TW)

(72) Inventors: Haw-Woei Pan, Hsin-Chu (TW); Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 306 days.

(21) Appl. No.: 16/395,169

(22) Filed: Apr. 25, 2019

(65) Prior Publication Data

US 2019/0331997 A1 Oct. 31, 2019

(30) Foreign Application Priority Data

Apr. 28, 2018 (CN) .......................... 201810402606.6

(51) Int. Cl.
*G03B 21/20* (2006.01)
*G02B 26/00* (2006.01)
(Continued)

(52) U.S. Cl.
CPC ....... *G03B 21/2053* (2013.01); *G02B 26/008* (2013.01); *G02B 27/141* (2013.01);
(Continued)

(58) Field of Classification Search
CPC ........ G03B 21/20; G03B 21/00; G03B 33/04; G03B 33/12; G02B 26/00; G02B 27/14; H04N 9/31
See application file for complete search history.

(56) References Cited

U.S. PATENT DOCUMENTS 8,840,253 B2   9/2014 Kitano
9,977,317 B2   5/2018 Wang et al.
(Continued)

FOREIGN PATENT DOCUMENTS

CN    101923273    12/2010
CN    102650813    8/2012
(Continued)

OTHER PUBLICATIONS

"Search Report of Europe Counterpart Application," dated Sep. 24, 2019, pp. 1-7.
(Continued)

*Primary Examiner* — Michelle M Iacoletti
*Assistant Examiner* — Danell L Owens
(74) *Attorney, Agent, or Firm* — JCIPRNET

(57) ABSTRACT

An illumination system comprises a blue light source, an excitation light source, a first dichroic element and a wavelength converting element. The blue light source provides a blue light beam. An excitation light source provides an excitation beam. The first dichroic element is disposed on transmitting paths of the blue light beam and the excitation beam. The wavelength converting element is disposed on a transmitting path of the excitation beam and adapted to convert the excitation beam into an excited beam. The excitation beam passes through the first dichroic element to the wavelength converting element and converted into the excited beam. The excited beam is transmitted to the first dichroic element and reflected. A wavelength of the blue light beam is greater than a wavelength of the excitation beam, and the blue light source and the excitation light source are disposed on the same side of the first dichroic element.

28 Claims, 18 Drawing Sheets

(51) Int. Cl.
*G02B 27/14* (2006.01)
*G03B 21/00* (2006.01)

(52) U.S. Cl.
CPC ......... *G03B 21/204* (2013.01); *G03B 21/208* (2013.01); *G03B 21/2066* (2013.01); *G03B 21/008* (2013.01)

(56) References Cited

U.S. PATENT DOCUMENTS

| | | |
|---|---|---|
| 2010/0141896 A1 | 6/2010 | Chen et al. |
| 2011/0205502 A1 | 8/2011 | Kato et al. |
| 2011/0310353 A1 | 12/2011 | Maeda |
| 2013/0100639 A1 | 4/2013 | Li et al. |
| 2013/0100644 A1 | 4/2013 | Hu et al. |
| 2013/0194551 A1 | 8/2013 | Zhang et al. |
| 2015/0029467 A1 | 1/2015 | Sugiyama et al. |
| 2015/0205189 A1* | 7/2015 | Nojima ................ H01L 33/501 353/31 |
| 2015/0219984 A1* | 8/2015 | Matsubara ......... G03B 21/2053 353/31 |
| 2015/0316775 A1 | 11/2015 | Hsieh et al. |
| 2016/0004148 A1 | 1/2016 | Chiu et al. |
| 2018/0080630 A1 | 3/2018 | Wang et al. |

FOREIGN PATENT DOCUMENTS

| | | |
|---|---|---|
| CN | 102681320 | 9/2012 |
| CN | 102890398 | 1/2013 |
| CN | 103034035 | 4/2013 |
| CN | 103809350 | 5/2014 |
| CN | 104238248 | 12/2014 |
| CN | 102289141 | 7/2015 |
| CN | 104765240 | 7/2015 |
| CN | 104980721 | 10/2015 |
| CN | 105022214 | 11/2015 |
| CN | 105223761 | 1/2016 |
| CN | 105319819 | 2/2016 |
| CN | 107329356 | 11/2017 |
| CN | 208283710 | 12/2018 |
| EP | 2787390 | 10/2014 |
| TW | 200916824 | 4/2009 |
| TW | 201542966 | 11/2015 |
| TW | 201546534 | 12/2015 |
| WO | 2016158297 | 10/2016 |

OTHER PUBLICATIONS

"Office Action of China Counterpart Application", dated Nov. 26, 2020, p. 1-p. 17.

"Office Action of Europe Counterpart Application", dated Jun. 17, 2021, p. 1-p. 4.

* cited by examiner

ILLUMINATION SYSTEM, PROJECTION DEVICE AND OPERATING METHOD THEREOF

CROSS-REFERENCE TO RELATED APPLICATION

This application claims the priority benefit of China application serial no. 201810402606.6, filed on Apr. 28, 2018. The entirety of the above-mentioned patent application is hereby incorporated by reference herein and made a part of this specification.

BACKGROUND OF THE DISCLOSURE

Field of the Disclosure

The disclosure is related to an optical system, an optical device and an operating method thereof, and particularly to an illumination system, a projection device and operating method thereof.

Description of Related Art

A projection device is a display device used for generating large-size frame, and has been continuously evolved and developed along with new technologies. The principle for projection device to form image is to convert an illumination beam generated by illumination system into an image beam through a light valve, and project the image beam onto a projection target (e.g., screen or wall surface) through a projection lens to form a projection frame.

Additionally, in order to meet the market's expectations for the brightness, color saturation, lifespan, being non-poisonous and environmental and so on, illumination system has been evolved from original ultra-high-performance lamp (UHP lamp) which belongs to ultra-high-voltage mercury lamp to light-emitting diode (LED), and now the most advanced laser diode (LD) light source is developed. However, in illumination system, typical method for generating red and green light with reasonable cost utilizes blue LD to excite the phosphor powder of fluorescence wheel to generate yellow green light. Then, the required red light or green light is filtered by using optical element to be put in use.

However, in typical illumination system configuration, considering that exciting phosphor powder requires the use of blue light source having shorter wavelength, the blue color exhibited in projection is shown as a purple-like color to human eyes, and the purple-like blue color affects visual effect.

The information disclosed in this "Description of Related Art" section is only for enhancement of understanding of the "Description of Related Art" section of the described technology and therefore it may contain information that does not form the prior art that is already known to a person of ordinary skill in the art. Further, the information disclosed in the "Description of Related Art" section does not mean that one or more problems to be resolved by one or more embodiments of the disclosure were acknowledged by a person of ordinary skill in the art.

SUMMARY OF THE DISCLOSURE

An embodiment of the disclosure provides an illumination system, a projection device and an operating method thereof, capable of improving the problem of purple-like blue light beam.

The objectives and advantages of the disclosure may be further understood in the technical features disclosed in the disclosure.

To achieve one or a part or all the objectives or other objectives, an embodiment of the disclosure provides an illumination system including a blue light source, an excitation light source, a first dichroic element and a wavelength converting element. The blue light source provides a blue light beam. The excitation light source provides an excitation beam. The first dichroic element is disposed on transmitting paths of the blue light beam and the excitation beam. The wavelength converting element is disposed on the transmitting path of the excitation beam and adapted to convert the excitation beam into an excited beam, wherein the excitation beam passes through the first dichroic element to the wavelength converting element and is converted into an excited beam. The excited beam is transmitted to the first dichroic element and reflected. The wavelength of the blue light beam is greater than the wavelength of the excitation beam, and the blue light source and the excitation light source are disposed on the same side of the first dichroic element.

To achieve one or a part or all the objectives or other objectives, another embodiment of the disclosure provides a projection device for providing a projection beam. The projection device includes an illumination system, at least one light valve and one lens module. The illumination system provides an illumination beam. The illumination system includes a blue light source, an excitation light source, a first dichroic element and a wavelength converting element. The blue light source provides a blue light beam. The excitation light source provides an excitation beam. The first dichroic element is disposed on transmitting paths of the blue light beam and excitation beam. The wavelength converting element is disposed on the transmitting path of the excitation beam and adapted to convert the excitation beam into an excited beam, wherein the excitation beam passes through the first dichroic element to the wavelength converting element and is converted into an excited beam. The excited beam is transmitted to the first dichroic element and reflected. At least one light valve is disposed on the transmitting path of the illumination beam and adapted to convert the illumination beam into at least one image beam. The lens module is disposed on the transmitting path of at least one image beam and adapted to form the at least one image beam into a projection beam, wherein the wavelength of the blue light beam is greater than the wavelength of the excitation beam, and the blue light source and the excitation light source are disposed on the same side of the first dichroic element.

To achieve one or a part or all the objectives or other objectives, the disclosure provides an operating method of a projection device, including the following steps: providing the projection device; changing the on, off or power-saving state of the blue light source and excitation light source respectively along with different timing periods, wherein at the first timing period, the on, off or power-saving states of the blue light source and the excitation light source are different.

Based on the above, the embodiments of the disclosure at least have one of the following advantages or effects. In the embodiments of the disclosure, the illumination system uses blue light source to provide the blue light portion of the illumination beam and uses excitation light source to provide the red light portion and green light portion of the illumination beam. Accordingly, the blue light source having longer wavelength may improve the purple-like blue color in the projection frame, thereby enhancing the optical quality of the projection device.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
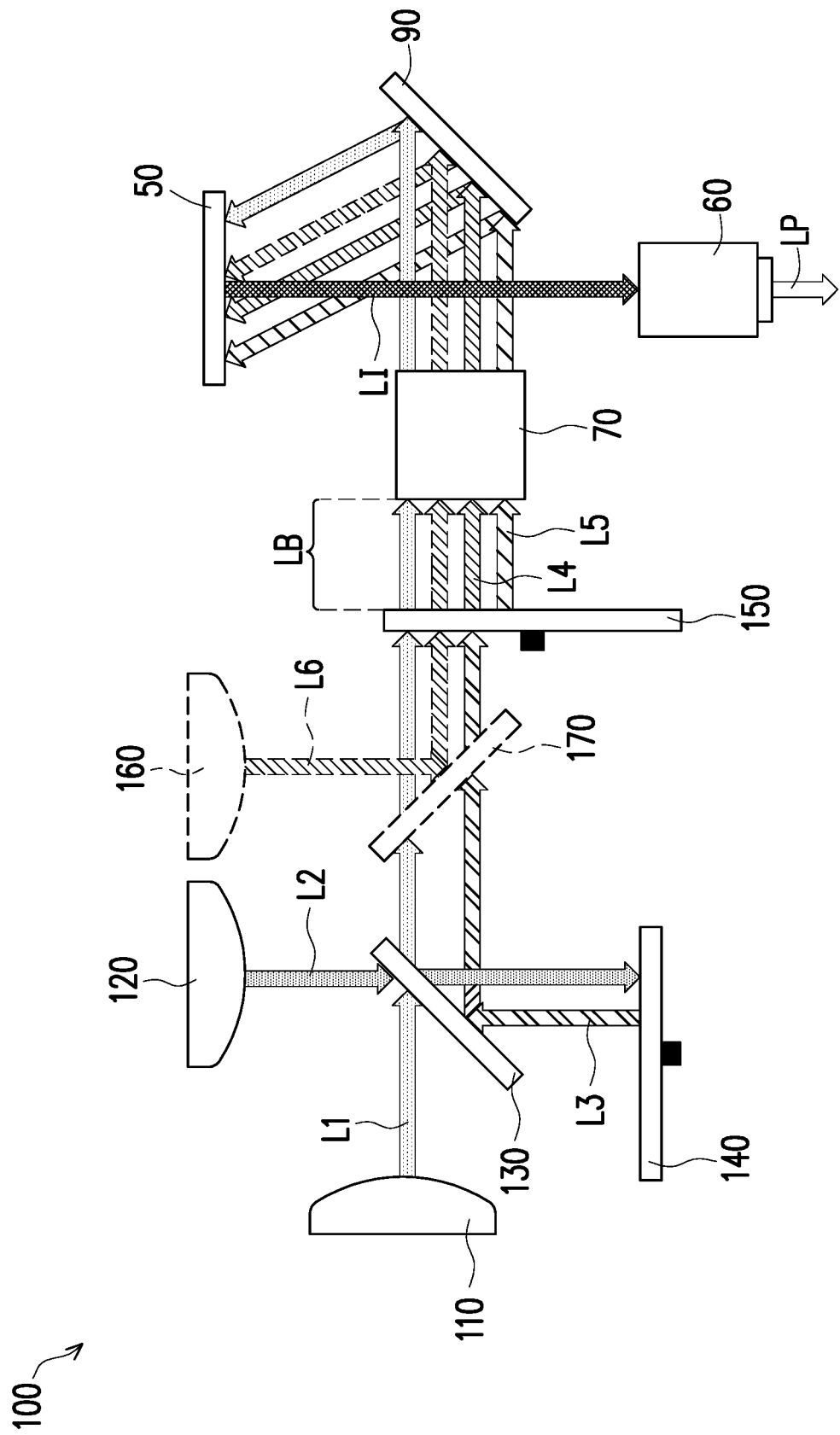
FIG. 1 is a schematic view of a projection device according to an embodiment of the disclosure.

FIG. 1 is a schematic view of a projection device according to an embodiment of the disclosure. Referring to FIG. 1, in the embodiment, a projection device 10 provides a projection beam LP. Specifically, the projection device 10 includes an illumination system 100, at least one light valve 50, a lens module 60 and a light uniformizing element 70, and the illumination system 100 provides an illumination beam LB. The light valve 50 is disposed on a transmitting path of the illumination beam LB and adapted to convert the illumination beam LB into at least one image beam LI. The lens module 60 is disposed on a transmitting path of the image beam LI and adapted to form the image beam LI into a projection beam LP, and the projection beam LP is projected onto a projection target (not shown) such as a screen or a wall surface.

In the embodiment, the light valve 50 is a reflective type light modulator such as a liquid crystal on silicon panel (LCoS panel), a digital micro-mirror device (DMD) or the like. In some embodiments, the light valve 50 may be a transmissive type light modulator, such as a transparent liquid crystal panel, an electro-optical modulator, a magneto-optic modulator, an acousto-optic modulator (AOM) or the like. The disclosure provides no limitation to the form and type of the light valve 50. Details and implementation manners of the method for converting the illumination beam LB into the image beam LI by the light valve 50 will be omitted since sufficient teachings, suggestions and descriptions of implementation can be obtained from common knowledge in the art. In the embodiment, the number of light valve 50 is one as in, for example, the projection device 10 using a single digital micro-mirror device, but the number of the light valve may be plural in other embodiments, the disclosure is not limited thereto.

The projection lens 60, for example, includes a combination of one or more optical lens having refractive powers, such as various combinations among non-planar lenses including a biconcave lens, a biconvex lens, a concave-convex lens, a convex-concave lens, a plano-convex lens and a plano-concave lens. In one embodiment, the projection lens 60 may further include a planar optical lens to project the image beam LI from the light valve 50 to the projection target by the means of reflection. The disclosure provides no limitation to the form and type of the projection lens 60.

The light uniformizing element 70 is disposed on the transmitting path of the illumination beam LB and adapted to adjust the speckle shape of the illumination beam LB, such that the speckle shape of the illumination beam LB coordinates the shape (e.g., rectangular shape) of an operation section of the light valve 50 and thus coherent or similar light intensity can be provided throughout the speckle, thereby uniformizing the light intensity of the illumination beam LB. In the embodiment, the light uniformizing element 70, for example, is an integrator, but in other embodiments, the light uniformizing element 70 may be an optical element of other suitable type such as a fly eye lens array, which should not be construed as a limitation to the disclosure.

Additionally, in some embodiments, the projection device 10 may further selectively include a reflecting element (mirror) 90. The reflecting element 90 guides the illumination beam LB emitted by the illumination system 100 to the light valve 50, but the disclosure is not limited thereto. In other embodiments, other optical elements may be used to guide the illumination beam LB to the light valve 50.

In the embodiment, the illumination system 100 includes a blue light source 110, an excitation light source 120, a first dichroic element 130, a wavelength converting element 140 and a filter element 150. Specifically, the blue light source 110 provides a blue light beam L1, and the excitation light source 120 provides an excitation beam L2. In the embodiment, the blue light source 110 and the excitation light source 120 are laser diode (LD), but in other embodiments, the blue light source 110 and the excitation light source 120 may be light emitting diode (LED) or organic light-emitting diode (OLED). Specifically, the light sources that meet the need of actual design may be implemented, and the disclosure provides no limitation to the form and type of the blue light source 110, the excitation light source 120 and other light sources in the following descriptions. The wavelength converting element 140 is, for example, a phosphor wheel, the filter element 150 is, for example, a color wheel.

In the embodiment, the excitation light source 120 is a short-wavelength blue light source. In other words, the blue light beam L1 is a long-wavelength blue light beam and the excitation beam L2 is a short-wavelength blue light beam. The wavelength of the blue light beam L1 is greater than the wavelength of the excitation beam L2. For example, the blue light beam L1 may have a wavelength of 460 nm, and the excitation beam L2 may have a wavelength of 445 nm. Accordingly, the embodiment uses the long-wavelength blue light beam (i.e., blue light beam L1) to provide the blue light portion of the projection beam LP, and uses the short-wavelength blue light beam (i.e., excitation beam L2) to excite the wavelength converting material of the wavelength converting element 140 to provide other color light such as yellow, green and red light portions of the projection beam LP. In this manner, the problem of frame with purple-like blue color provided in known techniques can be avoided, thereby enhancing the optical property of the projection device 10.

The first dichroic element 130 is disposed on the transmitting paths of the blue light beam L1 and the excitation beam L2, and the blue light source 110 and the excitation light source 120 are disposed on the same side of the first dichroic element 130. The blue light source 110 and the wavelength converting element 140 are disposed on two opposite sides of the first dichroic element 130. In the embodiment, the first dichroic element 130 is a dichroic mirror which reflects yellow light, but the disclosure is not limited thereto. According to other embodiments, the first dichroic element 130 may be realized in other types or forms, further details are provided below along with other embodiments.

Figure 2A:
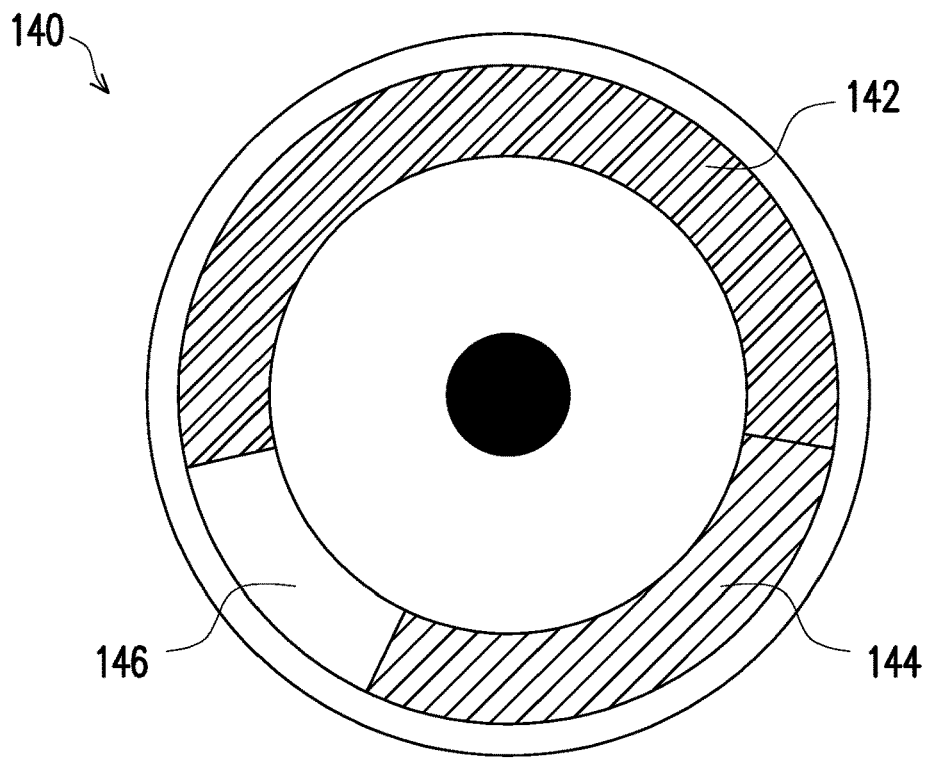
FIG. 2A is a schematic front view of a wavelength converting element of the projection device of FIG. 1.

FIG. 2A is a schematic front view of a wavelength converting element of the projection device of FIG. 1. Referring to FIG. 1 and FIG. 2A, in the embodiment, the wavelength converting element 140 is disposed on the transmitting path of the excitation beam L2, and the first dichroic element 130 is disposed between the excitation light source 120 and the wavelength converting element 140. The blue light source 110 and the wavelength converting element 140 are disposed on two opposite sides of the first dichroic element 130. The wavelength converting element 140 has a wavelength converting material (e.g., phosphor material) to convert the excitation beam L2 into an excited beam L3. Specifically, the wavelength converting element 140 includes a first converting section 142, a second converting section 144 and an optical section 146, wherein the first converting section 142 converts the excitation beam L2 into a first excited beam (yellow light), and the second converting section 144 converts the excitation beam L2 into a second excited beam (green light). In the embodiment, the first converting section 142 is, for example, a yellow light converting material, and the second converting section 144 is, for example, a green light converting material, but the disclosure is not limited thereto.

Figure 2B:
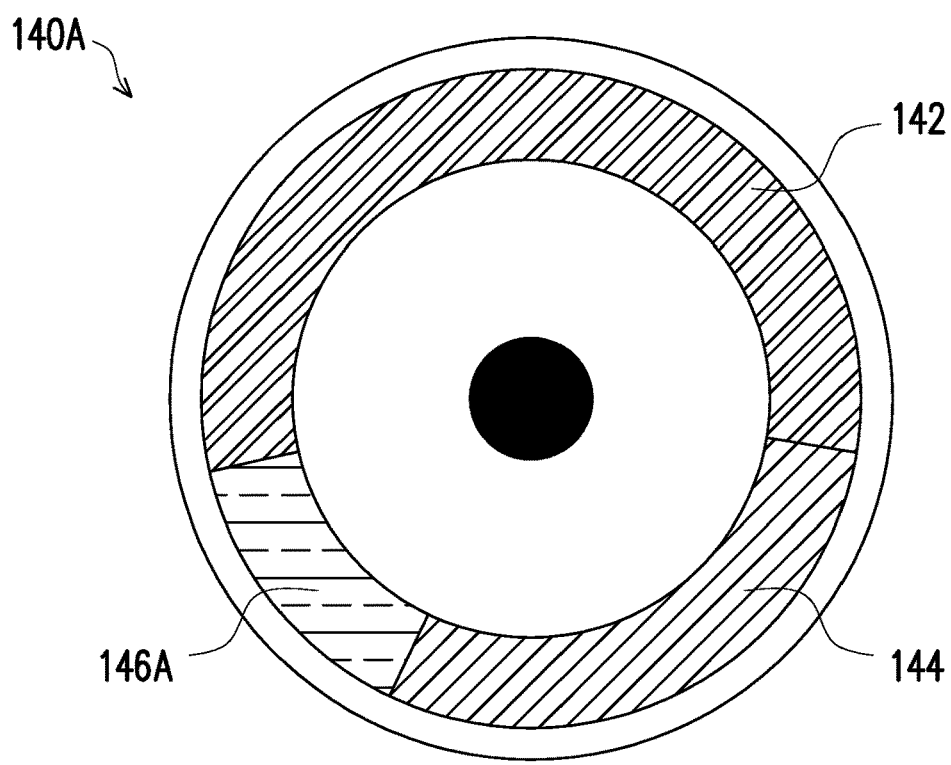
FIG. 2B is a schematic front view of another wavelength converting element of the projection device of FIG. 1.

FIG. 2B is a schematic front view of another wavelength converting element of the projection device of FIG. 1. FIG. 2B is different from FIG. 2A in that, in the embodiment, an optical section 146A of a wavelength converting element 140A further includes a wavelength converting material, wherein the wavelength converting material of the optical section 146A is a green light converting material, but the disclosure is not limited thereto. In the embodiment, the wavelength converting material in the optical section 146A may have the same concentration as the wavelength converting material in the second converting section 144; therefore, the wavelength converting material in the optical section 146A converts the excitation beam L2 into green light. In other embodiments, the concentration of the wavelength converting materials may be different. For example, the optical section 146A has a concentration of wavelength converting material less than the concentration of the wavelength converting material in the second converting section 144; therefore, the wavelength converting material in the optical section 146A converts the excitation beam L2 into cyan light.

The wavelength converting material in the optical section 146A is a green light converting material, but the disclosure is not limited thereto.

Figure 3A:
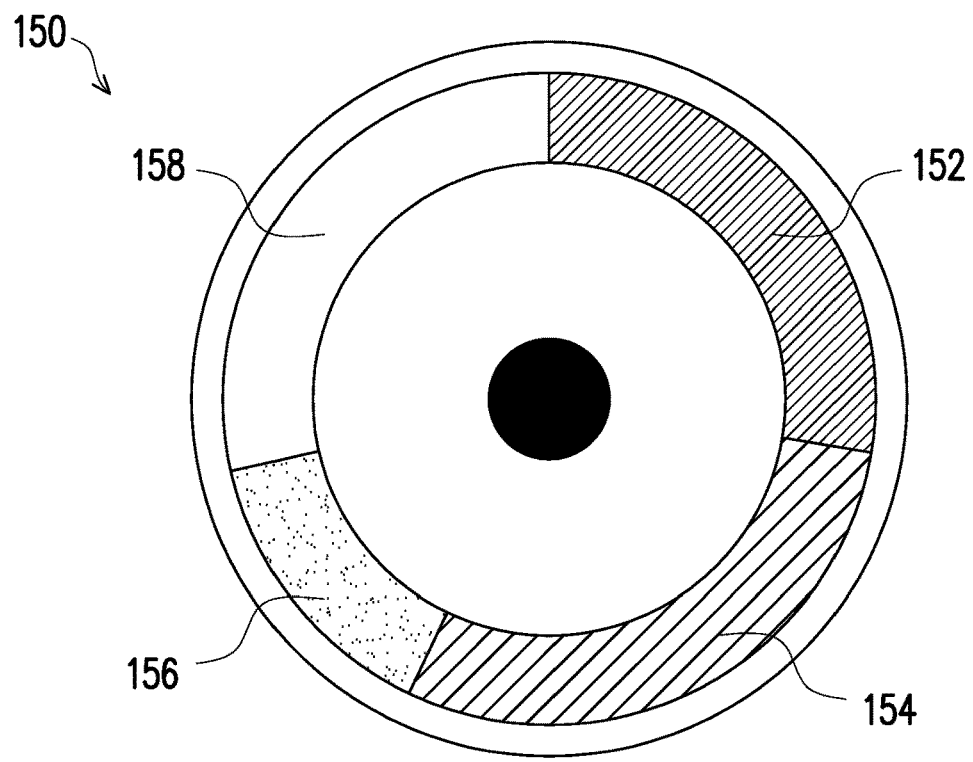
FIG. 3A and FIG. 3B are schematic front views of filter element of the projection device of FIG. 1 in different embodiments.
Figure 3B:
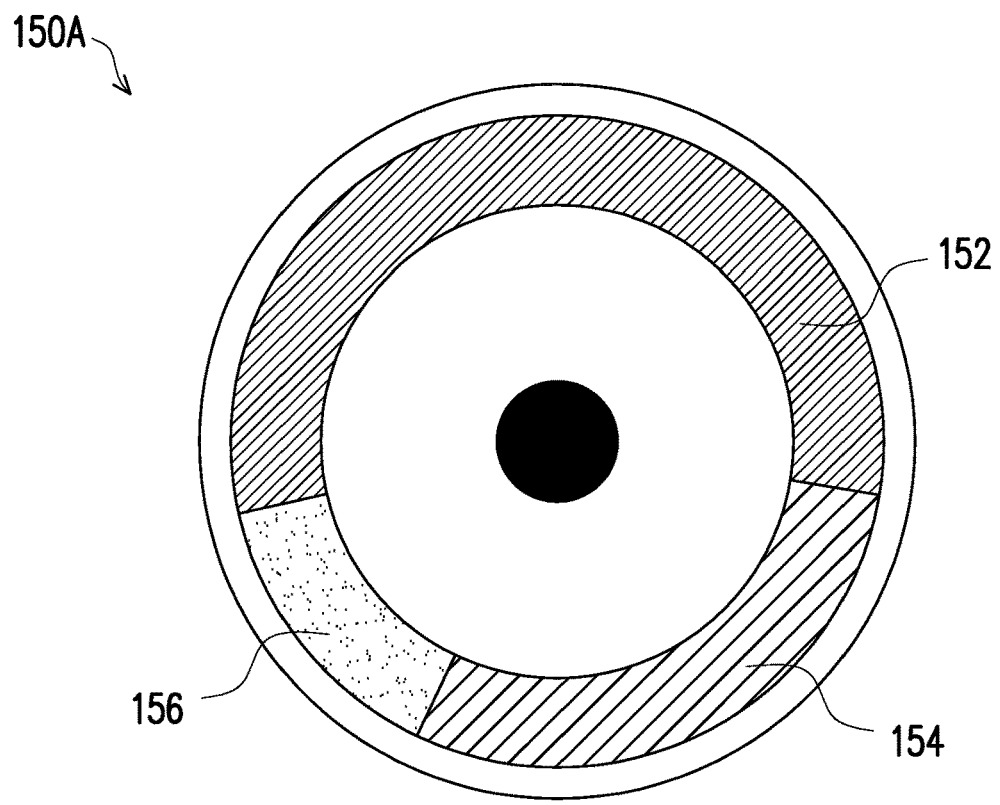

FIG. 3A and FIG. 3B are schematic front views of a filter element of the projection device of FIG. 1 in different embodiments. Referring to FIG. 1 and FIG. 3A, in the embodiment, the filter element 150 is disposed on the transmitting paths of the blue light beam L1 and the excited beam L3. Accordingly, when the excitation light source 120 is activated, the excitation beam L2 passes through the first dichroic element 130 to the wavelength converting element 140 and is converted into the excited beam L3, and the excited beam L3 is transmitted to the first dichroic element 130 and reflected to the filter element 150 to generate red light, green light or yellow light. Specifically, the filter element 150 includes a first filter section 152, a second filter section 154, a diffusion section 156 and a light-transmissible section 158, wherein the excited beam L3 includes a first red light beam L4 and a green light beam L5, and the first filter section 152 allows the first red light beam L4 to pass through, the second filter section 154 allows the green light beam L5 to pass through.

Additionally, referring to FIG. 3A and FIG. 3B, in other embodiments, the diffusion section 156 of the filter element 150 may further include a filter coating. The filter coating allows blue light, green light or cyan light to pass through.

Figure 4A:
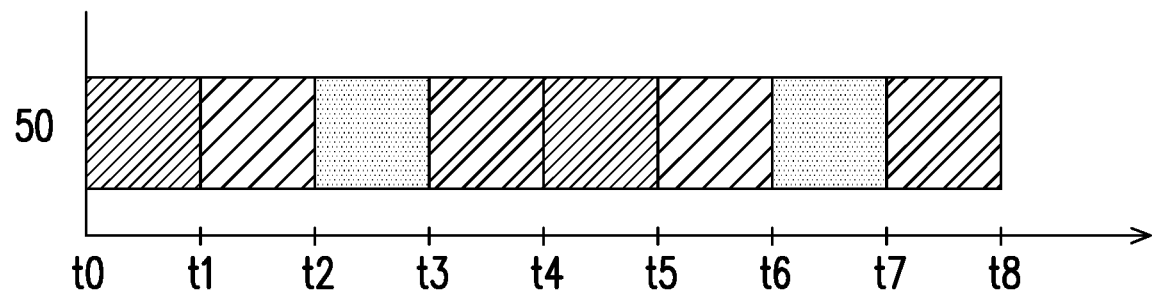
FIG. 4A to FIG. 4C are timing period diagrams showing the projection device in FIG. 1 in different embodiments.
Figure 4B:
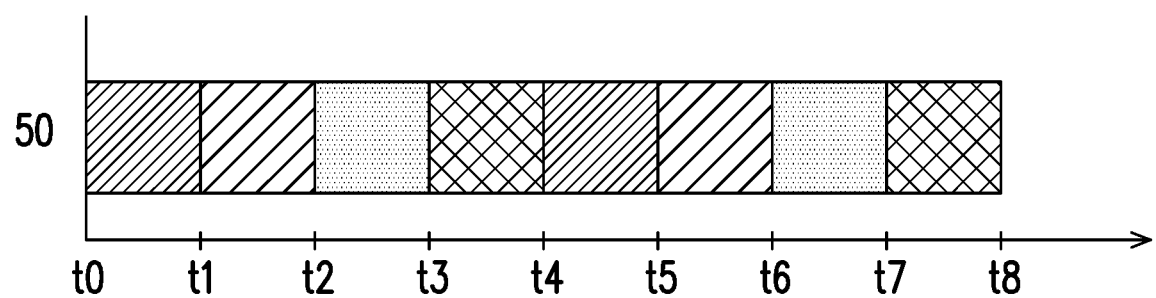
Figure 4C:
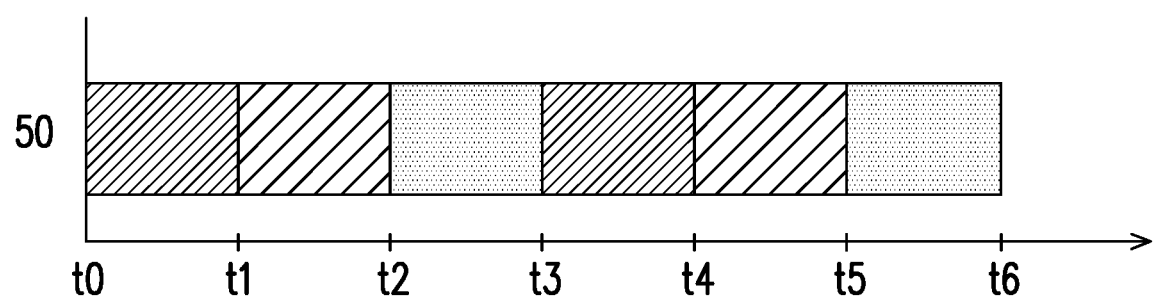

FIG. 4A to FIG. 4C are timing period diagrams of the projection device in FIG. 1 in different embodiments. Referring to FIG. 1, FIG. 2A, FIG. 3A and FIG. 4A, in the embodiment, the illumination system 100 has a first timing period, a second timing period, a third timing period and a fourth timing period when being operated, and the blue light source 110 and the excitation light source 120 are changed between on, off or power-saving state according to the timing periods, such that the light beam (i.e., illumination beam LB provided by illumination system) that is changed according to the timing period is received by the light valve 50 as shown in FIG. 4A.

Specifically, at the first timing period (t0-t1 or t4-t5), the blue light source 110 is in the off state or power-saving state, and the excitation beam L2 emitted by the excitation light source 120 passes through the first dichroic element 130 to the first converting section 142 of the wavelength converting element 140 to generate a portion (i.e., first excited beam) of the excited beam L3. A portion of the excited beam L3 generated by the wavelength converting element 140 is transmitted to the first dichroic element 130 and reflected to pass through the first filter section 152 of the filter element 150 to generate a red light portion (i.e., first red light beam L4) of the illumination beam LB. Additionally, it can be obtained by persons skilled in the art that the power-saving state is defined as that the light source is continuously in the on state but the intensity of emission of light becomes weak, or that the light beam is emitted after the light source is operated for a period of time, that is, the light source does not emit light beam although the light source has current or voltage.

At the second timing period (t1-t2 or t5-t6), the blue light source 110 is in the off or power-saving state, and the excitation beam L2 emitted by the excitation light source 120 passes through the first dichroic element 130 to the second converting section 144 of the wavelength converting element 140 to generate another portion (i.e., second excited beam) of the excited beam L3. Another portion of the excited beam L3 generated by the wavelength converting element 140 is transmitted to the first dichroic element 130 and reflected to pass through the second filter section 154 of the filter element 150 to generate the green light portion (i.e., green light beam L5) of the illumination beam LB.

At the third timing period (t2-t3 or t6-t7), the excitation light source 120 is in the off state or power-saving state, and the blue light beam L1 emitted by the blue light source 110 sequentially passes through the first dichroic element 130 and the diffusion section 156 of the filter element 150 to generate the blue light portion of the illumination beam LB. In this manner, the blue light portion of the illumination beam LB may achieve diffusion uniforming by passing through the diffusion section 156. The diffusion section 156 eliminates the laser speckle on the projection target that is irradiated by the blue light portion of the illumination beam LB.

At the fourth timing period (t3-t4 or t7-t8), the blue light source 110 is in the off state of the power-saving state, and the excitation beam L2 emitted by the excitation light source 120 passes through the first dichroic element 130 to the first converting section 142 of the light wavelength converting element 140 to generate a portion (i.e., first excited beam) of the excited beam L3. A portion of the excited beam L3 generated by the wavelength converting element 140 is transmitted to the first dichroic element 130 and reflected to pass through the light-transmissible section 158 of the filter element 150 to generate yellow light beam (not shown). Therefore, at the fourth timing period of the embodiment, the excitation light source 120 may further provide the yellow light beam to the light valve 50, such that the projection beam LP provided by the projection device 10 has better brightness and accurate color.

Next, referring to FIG. 4B, at the fourth timing period of the above embodiment, the blue light source 110 and the excitation light source 120 may be in the on state simultaneously. Specifically, the blue light beam L1 emitted by the blue light source 110 sequentially passes through the first dichroic element 130 and the light-transmissible section 158 of the filter element 150 to generate the blue light portion of the illumination beam LB. The excitation beam L2 emitted by the excitation light source 120 passes through the first dichroic element 130 to the first converting section 142 of the wavelength converting element 140 to generate a portion of the excited beam L3, and a portion of the excited beam L3 generated by the wavelength converting element 140 is transmitted to the first dichroic element 130 and reflected to pass through the light-transmissible section 158 of the filter element 150 to generate the yellow light beam. In other words, at the fourth timing period, the blue light portion provided by the blue light source 110 and the yellow light portion provided by the excitation light source 120 are mixed as white light. In this manner, the projection beam LP provided by the projection device 10 has better brightness and optical quality.

Thereafter, referring to FIG. 1, FIG. 2A, FIG. 3B and FIG. 4C, the embodiment is different from the above embodiment in that, in the embodiment, the filter element 150 of the illumination system 100 may be changed into a filter element 150A, and the illumination system 100 only has the first timing period (t0-t1 or t3-t4), the second timing period (t1-t2 or t4-t5) and the third timing period (t3-t4 or t5-t6). The blue light source 110 and the excitation light source 120 are respectively changed between the on, off or power-saving state according to the timing periods, such that the light beam (i.e., illumination beam LB provided by the illumination system) that is changed according to timing periods is received by the light valve 50 as shown in FIG. 4C.

Specifically, the illumination system in the embodiment at the first timing period, the second timing period and the third timing period is similarly operated as in the above embodiment at the first timing period, the second timing period and the third timing period; the difference between the two is that the filter element 150A in the embodiment only includes the first filter section 152, the second filter section 154 and the diffusion section 156. Accordingly, the illumination system 100 in the embodiment provides the red light portion, the green light portion and the blue light portion of the illumination beam LB at the first timing period, the second timing period and the third timing period respectively. Details and implementation manners of the above steps will be omitted since sufficient teachings, suggestions and descriptions of implementation can be obtained from common knowledge in the art.

Referring to FIG. 1, FIG. 2B, FIG. 3A and FIG. 4A, in the embodiment, the illumination system 100 has a first timing period, a second timing period, a third timing period and a fourth timing period in operation, and the blue light source 110 and the excitation light source 120 are changed between the on, off or power-saving state respectively according to the timing periods, such that the light beam (i.e., illumination beam LB provided by the illumination system) that is changed according to the timing periods is received by the light valve 50 as shown in FIG. 4A.

Specifically, at the first time timing period (t0-t1 or t4-t5), the blue light source 110 is in the off state or the power-saving state, and the excitation beam L2 emitted by the excitation light source 120 passes through the first dichroic element 130 to the first converting section 142 of the wavelength converting element 140 to generate a portion (i.e., first excited light beam) of the excited beam L3. A portion of the excited beam L3 generated by the wavelength converting element 140 is transmitted to the first dichroic element 130 and reflected to pass through the first filter section 152 of the filter element 150 to generate the red light portion (i.e., first red light beam L4) of the illumination beam LB.

At the second timing period (t1-t2 or t5-t6), the blue light source 110 is in the off state of the power-saving state, and the excitation beam L2 emitted by the excitation light source 120 passes through the first dichroic element 130 to the second converting section 144 of the wavelength converting element 140 to generate another portion (i.e., second excited beam) of the excited beam L3. Another portion of the excited beam L3 generated by the wavelength converting element 140 is transmitted to the first dichroic element 130 and reflected to pass through the second filter section 154 of the filter element 150 to generate the green light portion (i.e., green light beam L5) of the illumination beam LB.

At the third timing period (t2-t3 or t6-t7), the excitation light source 120 is in the on state, and the blue light source 110 is in the on state. The excitation beam L2 emitted by the excitation light source 120 passes through the first dichroic element 130 to the optical section 146A of the wavelength converting element 140 to generate another portion (i.e., third excited beam, e.g., green light or cyan light) of the excited beam L3, and simultaneously transmitted to the diffusion section 156 of the filter element 150 along with the blue light beam L1 emitted by the blue light source 110. Accordingly, the third excited beam and the blue light beam L1 are used to generate the blue light portion of the illumination beam LB. In this manner, the color coordinate of the blue light can be adjusted such that the color of the projection beam LP is more saturated to exhibit the real color of image.

It should be indicated that, in other embodiments, the intensity of the excitation beam L2 emitted by the excitation light source 120 is the same as the intensity of the blue light beam L1 emitted by the blue light source 110, which coordinates that the wavelength converting material in the optical section 146A has the same concentration as the wavelength converting material in the second converting section 144. In other embodiments, the intensity of the excitation beam L2 emitted by the excitation light source 120 is the same as the intensity of the blue light beam L1 emitted by the blue light source 110, which coordinates that the optical section 146A has a concentration of the wavelength converting material different from the wavelength converting material in the second converting section 144. In other embodiments, the intensity of the excitation beam L2 emitted by the excitation light source 120 is different from the intensity of the blue light beam L1 emitted by the blue light source 110. For example, the intensity of the excitation beam L2 emitted by the excitation light source 120 is weaker than the intensity of the blue light beam L1 emitted by the blue light source 110, which coordinates that the optical section 146A has the same concentration of the wavelength converting material as the wavelength converting maternal in the second converting section 144.

The purpose of the above embedment is to adjust the color coordinate of blue light such that the color of the projection beam LP is more saturated to exhibit the real color of image.

At the fourth timing period (t3-t4 or t7-t8), the blue light source 110 is in the off state or the power-saving state, and the excitation beam L2 emitted by the excitation light source 120 passes through the first dichroic element 130 to the first converting section 142 of the wavelength converting element 140 to generate a portion (i.e., first excited beam) of the excited beam L3. A portion of the excited beam L3 generated by the wavelength converting element 140 is transmitted to the first dichroic element 130 and reflected to pass through the light-transmissible section 158 of the filter element 150 to generate the yellow light beam (not shown). Accordingly, at the fourth timing period in the embodiment, the excitation light source 120 may further provide the yellow light beam to the light valve 50 such that the projection beam LP provided by the projection device 10 has better brightness and accurate color. Details and implementation manners of the above steps will be omitted since sufficient teachings, suggestions and descriptions of implementation can be obtained from common knowledge in the art.

Further referring to FIG. 1, FIG. 3A, FIG. 3B and FIG. 4A to FIG. 4C, in the embodiment, the illumination system 100 further includes a red light source 160 and a second dichroic element 170. The red light source 160 is, for example, a red laser diode or a red light-emitting diode, which is used to provide a second red light beam L6. The second dichroic element 170 is a dichroic mirror that reflects red light and allows the blue light beam LI to pass through. The second dichroic element 170 is disposed on transmitting paths of the blue light beam LI and the second red light beam L6. The red light source 160 is activated at the first timing period in any one of the above embodiments to provide a second red light beam L6, and the second red light beam L6 is transmitted to the second dichroic element 170 and reflected to the first filter section 152, thereby providing additional red light portion of the illumination beam LB. In this manner, in the circumstances where color performance is emphasized (e.g., home theater circumstances), the projection beam LP provided by the projection device 10 has better color saturation and optical quality. In the embodiment, the red light source 160 and the second dichroic element 170 are disposed between the first dichroic element 130 and the filter element 150, which should not be construed as a limitation to the disclosure.

Figure 5:
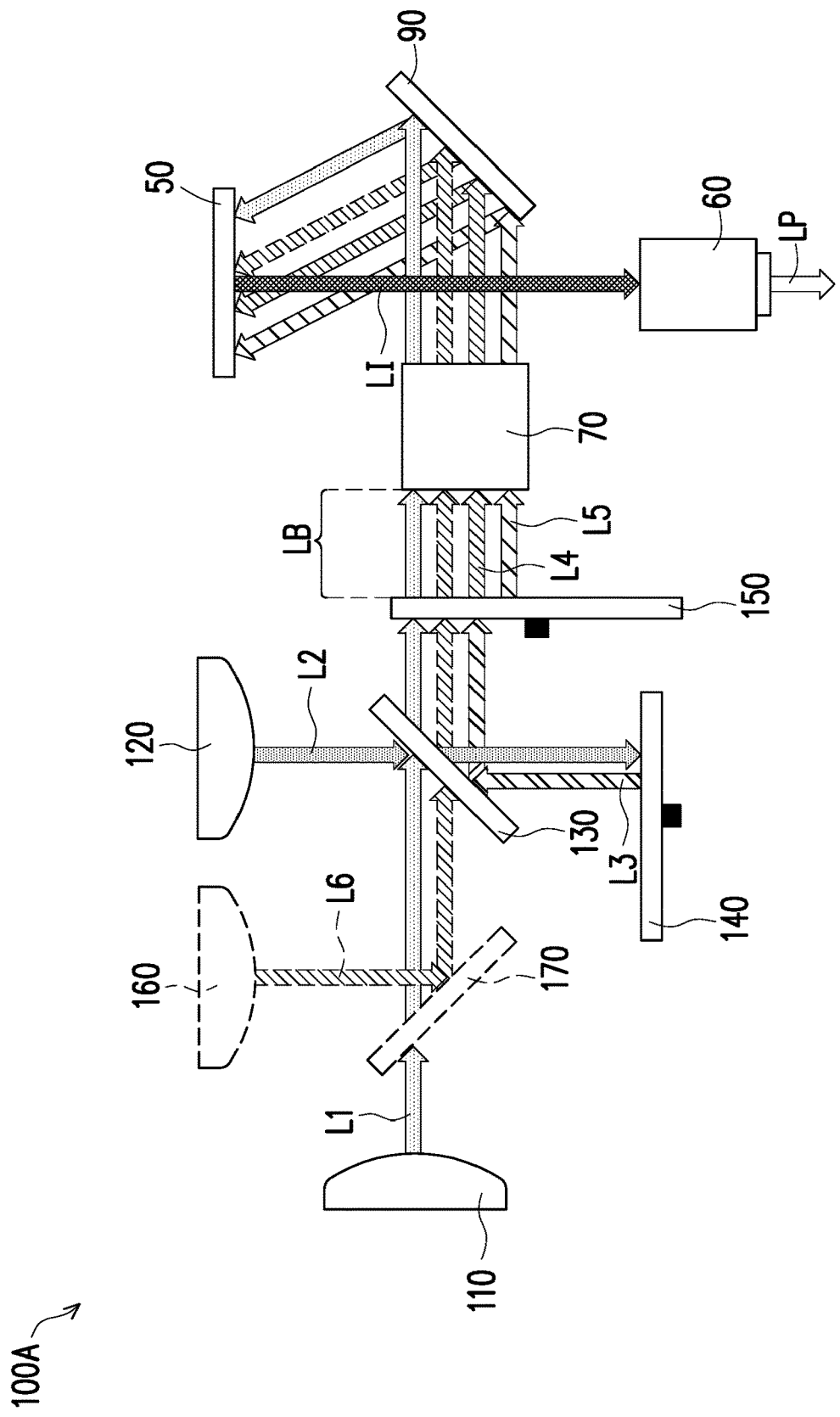
FIG. 5 is a schematic view of a projection device according to another embodiment of the disclosure.

FIG. 5 is a schematic view of a projection device according to another embodiment of the disclosure. Referring to FIG. 5, a projection device 10A in the embodiment is similar to the projection device 10 in FIG. 1, and the difference between the two is that, in the embodiment, the red light source 160 and the second dichroic element 170 of the illumination system 100A are disposed between the blue light source 110 and the first dichroic element 130. In this manner, the second light beam L6 provided by the red light source 160 is transmitted to the second dichroic element 170 and reflected to pass through the first dichroic element 130 and the first filter section 152, thereby providing additional red light portion of the illumination beam LB.

Additionally, in FIG. 1 or FIG. 5, the first dichroic element 130 and the second dichroic element 170 are disposed in a non-parallel manner. An included angle is formed between an extending line of the first dichroic element 130 and an extending line of the second dichroic element 170, and the included angle is approximately 90 degrees.

Figure 6:
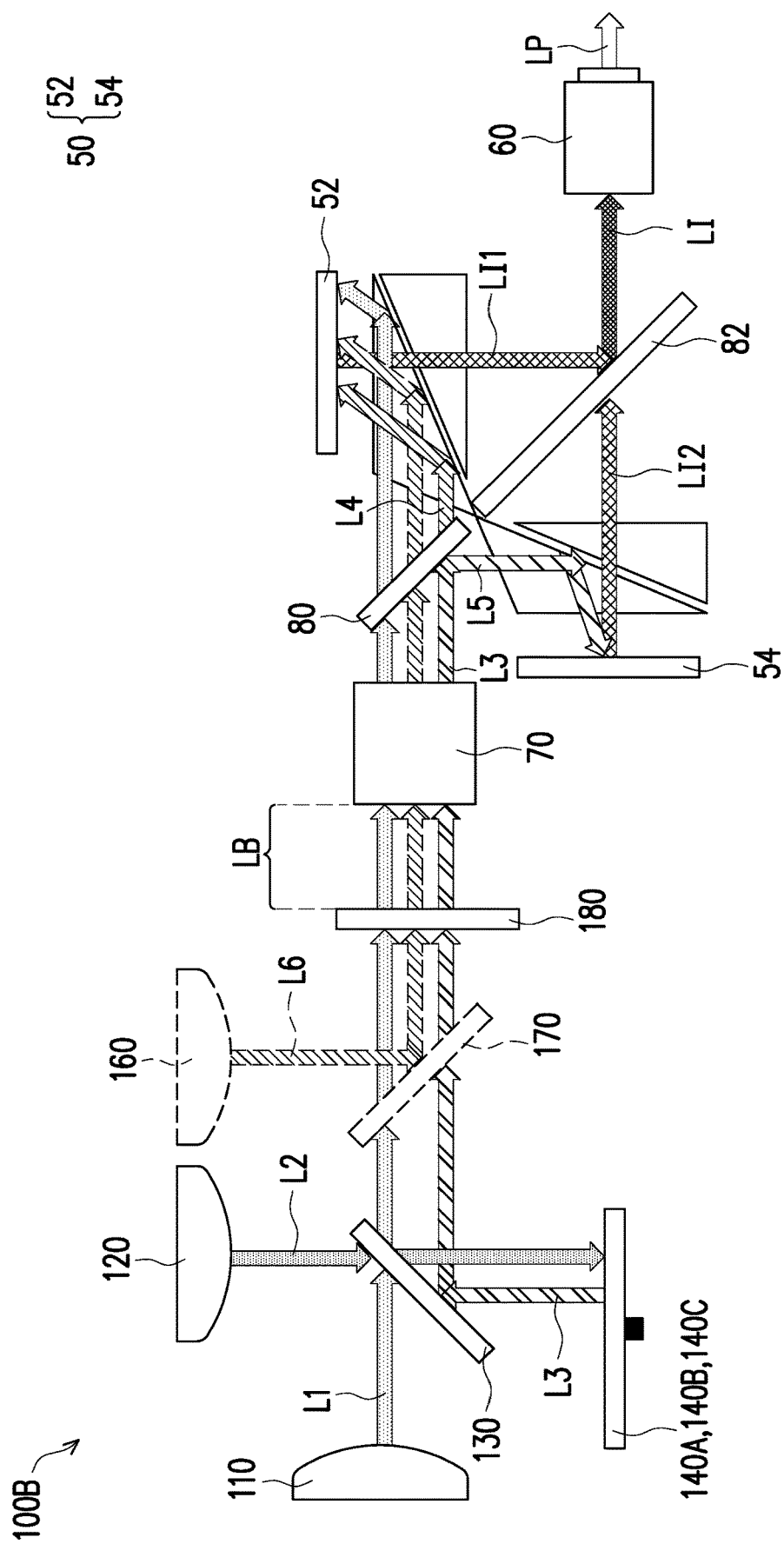
FIG. 6 is a schematic view of a projection device according to another embodiment of the disclosure.
Figure 7A:
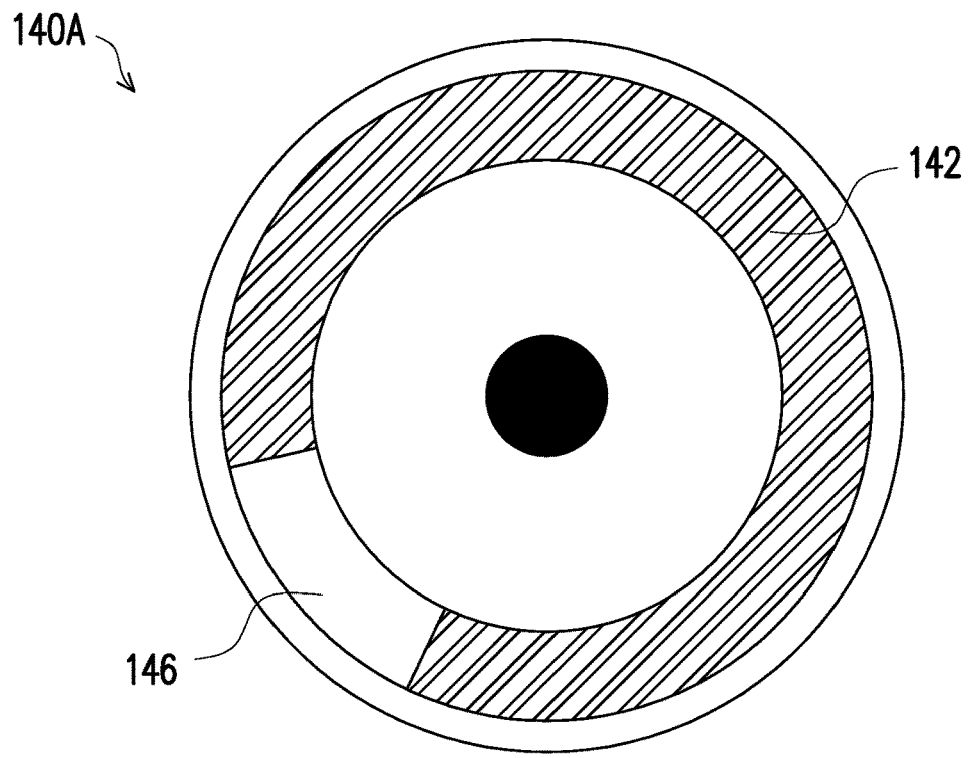
FIG. 7A, FIG. 7B and FIG. 7C are schematic front views of a wavelength converting element of the projection device in FIG. 6 in different embodiments.
Figure 7B:
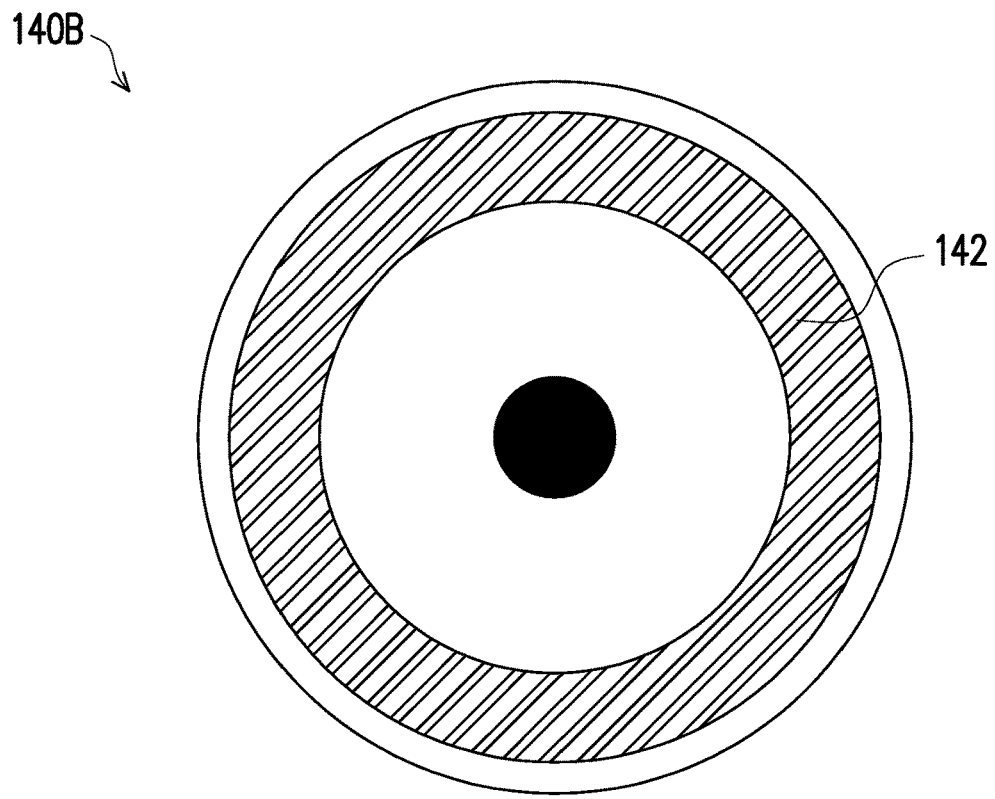

FIG. 6 is a schematic view of a projection device according to another embodiment of the disclosure. FIG. 7A and FIG. 7B are schematic front views of a wavelength converting element of the projection device in FIG. 6 in different embodiments. FIG. 8A and FIG. 8B are timing period diagrams showing the projection device in FIG. 6 in different embodiments. Referring to FIG. 6 to FIG. 8B, a projection device 20 in the embodiment is similar to the projection device 10 in FIG. 1. The difference between the two is that, in the embodiment, at least one light valve 50 of the protection device 20 includes a first light valve 52 and a second light valve 54, and is, for example, a projection device 20 using two digital micro-mirror devices. The projection device 20 further includes at least one dichroic mirror 80, which is disposed on the transmitting path of the excited beam L3 and adapted to allow one of the first red light beam L4 and the green light beam L5 to pass through and transmitted to the first light valve 52, and the other one is reflected through the dichroic mirror 80 and transmitted to the second light valve 54. An illumination system 100B further includes a diffuser 180 disposed on the transmitting path of the blue light beam L1 to uniformize diffusion of the blue light beam L1.

The illumination system 100B has the first timing period (t0-t1 or t2-t3) and the second timing period (t1-t2 or t3-t4) in operation, and the blue light source 110 and the excitation light source 120 are changed between the on, off or power-saving state respectively according to the timing periods, such that the light beam (i.e., illumination beam LB provided by the illumination system) that is changed according to timing periods is received by first light valve 52 and the second light valve 54 as shown in FIG. 8A.

Specifically, at the first timing period (t0-t1 or t2-t3), the blue light source 110 is in the on state or the power-saving state, and the excitation beam L2 emitted by the excitation light source 120 passes through the first dichroic element 130 to the first converting section 142 of the wavelength converting element 140A to generate the excited beam L3 as shown in FIG. 7A. The excited beam L3 generated by the wavelength converting element 140A is transmitted to the first dichroic element 130 and reflected to pass through the diffusor 180 to generate the red light portion and the green light portion (i.e., first red light beam L4 and green light beam L5) of the illumination beam LB.

Next, the red light portion and the green light portion of the illumination beam LB are transmitted to the dichroic mirror 80, the red light portion of the illumination beam LB passes through the dichroic mirror 80 and transmitted to the first light valve 52, and the green light portion of the illumination beam LB is reflected by the dichroic mirror 80 and transmitted to the second light valve 54 as shown in FIG. 8A. Thereafter, a first sub-image beam LI1 and a second sub-image beam LI2 generated by the first light valve 52 and the second light valve 54 are combined by a combining element 82 into a portion of the image beam LI and transmitted to the lens module 60, that is, the combining element 82 reflects the first sub-image beam LI1 and allows the second sub-image beam LI2 to pass through and transmitted to the lens module 60. However, in another embodiment, the red light portion of the illumination beam LB may be reflected by the dichroic mirror 80 and transmitted to the second light valve 54, and the green light portion of the illumination beam LB may be transmitted to the first light valve 52 by the dichroic mirror 80, but the disclosure provides no limitation thereto.

At the second timing period (t1-t2 or t3-t4), the excitation light source 120 is in the off state of the power-saving state, and the blue light beam L1 emitted by the blue light source 110 sequentially passes through the first dichroic element 130 and diffusor 180 to generate the blue light portion of the illumination beam LB and transmitted to the first light valve 52 through the dichroic mirror 80. As shown in FIG. 8A, in another embodiment, the blue light portion of the illumination beam LB is reflected by the dichroic mirror 80 and transmitted to the second light valve 54 as shown in FIG. 8B. Additionally, the blue light portion of the illumination beam LB may achieve diffusion uniforming by passing through the diffusor 180. Referring to FIG. 6, FIG. 8A and FIG. 8B, in the embodiment, the blue light portion of the illumination beam LB passes through the dichroic mirror 80 and transmitted to the first light valve 52 to form a portion of the first sub-image beam LI1, the combining element 82 allows a portion of the first sub-image beam LI1 to be reflected and transmitted to the lens module 60. In other embodiments, the blue light portion of the illumination beam LB may be reflected and transmitted to the second light valve 54 by the dichroic mirror 80, but the disclosure is not limited thereto.

In the embodiment, the wavelength converting element 140A includes the first converting section 142 and the optical section 146. At the second timing period (t1-t2 or t3-t4), the optical section 146A does not receive the excitation beam L2 from the excitation light source 12 and thus a portion of the wavelength converting material can be saved. However, in other embodiments, the wavelength converting element 140A may be changed into a wavelength converting element 140B which is only be provided with the first converting section 142 having the wavelength converting material to simplify the manufacturing process of the wavelength converting element 140A as shown in FIG. 7B, but the disclosure is not limited thereto.

Referring to FIG. 6, in the embodiment, the illumination system 100B may further include the red light source 160 and the second dichroic element 170. The second dichroic element 170 is a dichroic mirror that reflects red light and disposed on the transmitting paths of the blue light beam L1 and the second red light beam L6. The red light source 160 is activated at the first timing period of the above embodiment to provide the second red light beam L6, and the second red light beam L6 is transmitted to the second dichroic element 170 and reflected to the diffusor 180, thereby providing additional red light portion of the illumination beam LB. In this manner, in the circumstances where the color performance is emphasized (e.g., home theater circumstances), the projection beam LP provided by the projection device 20 has better color saturation and optical quality. In the embodiment, the red light source 160 and the second dichroic element 170 are disposed between the first dichroic element 130 and the diffusor 180, but the disclosure is not limited thereto.

Figure 7C:
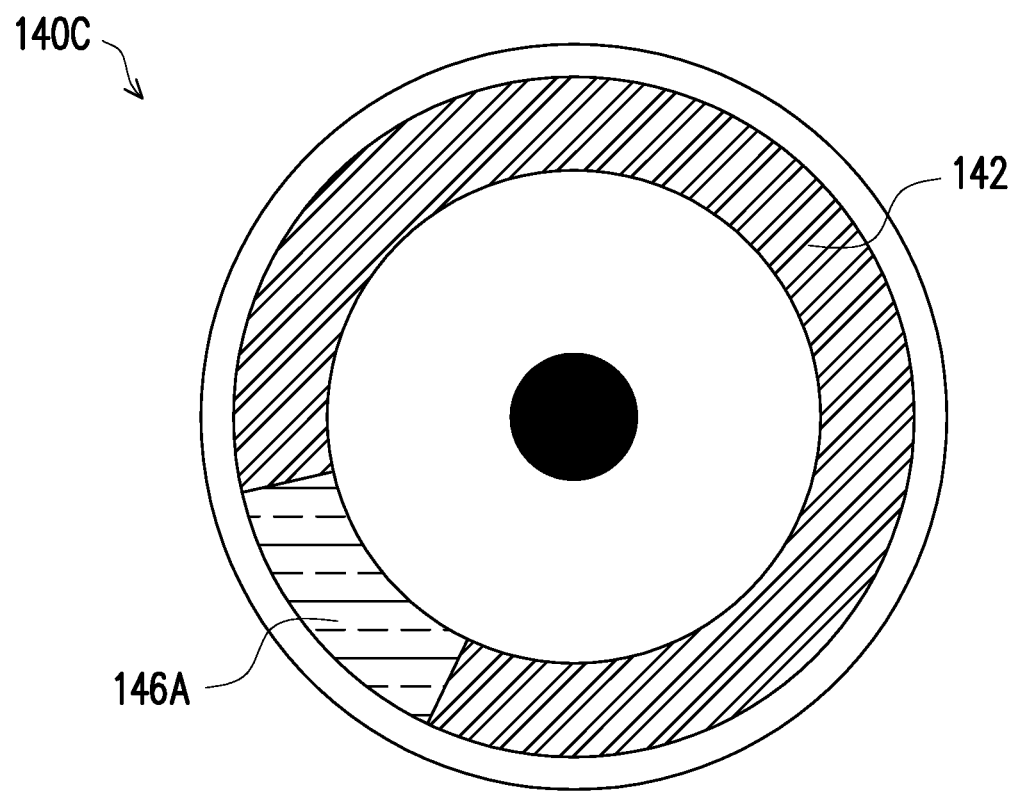
Figure 8A:
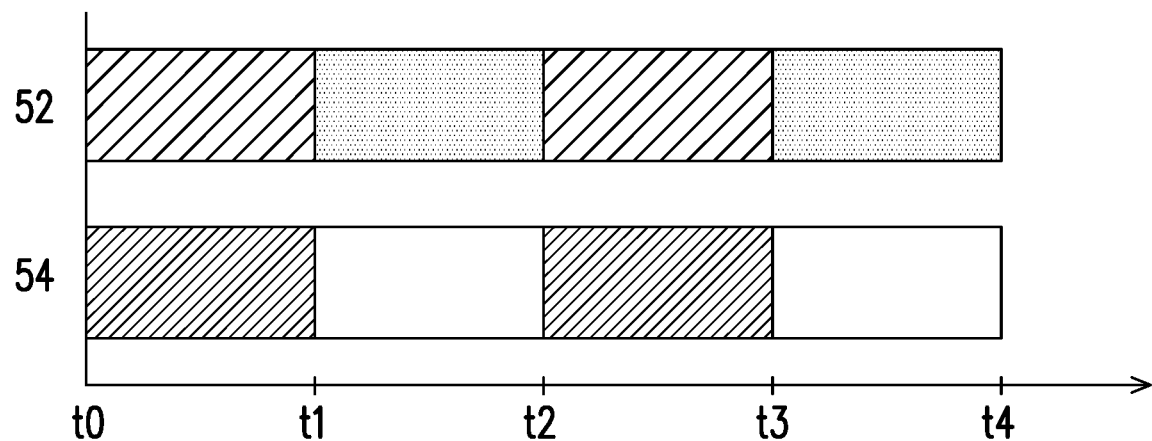
FIG. 8A, FIG. 8B and FIG. 8C are timing period diagrams showing the projection device in FIG. 6 in different embodiments.
Figure 8B:
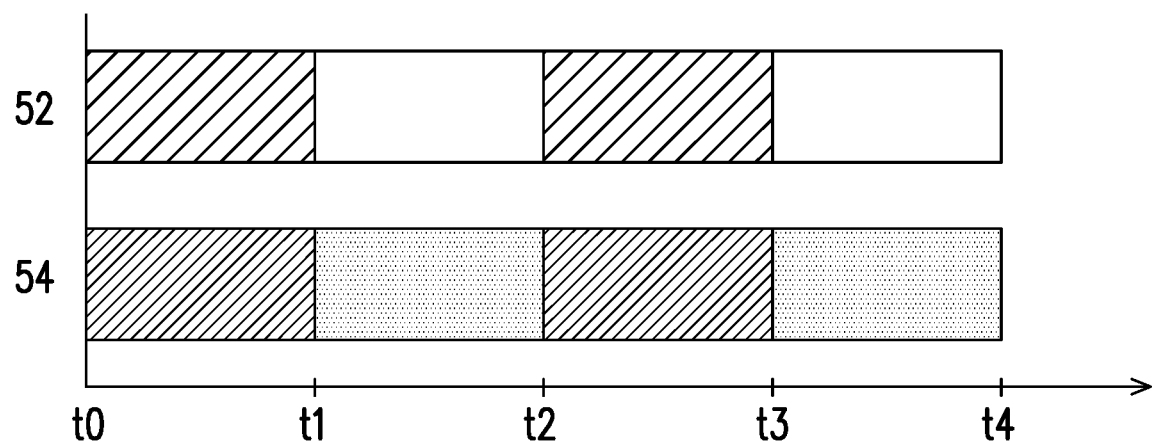

FIG. 7C is a schematic front view of another wavelength converting element of the projection device in FIG. 6. FIG.

7C is different from FIG. 7A in that, in the embodiment, the optical section 146A of the wavelength converting element 140C further includes a wavelength converting material, wherein the wavelength converting material in the optical section 146A is a green light converting material, but the disclosure is not limited thereto. In the embodiment, the wavelength converting material in the optical section 146A converts the excitation beam L2 into green light or cyan light, but the disclosure is not limited thereto.

Figure 8C:
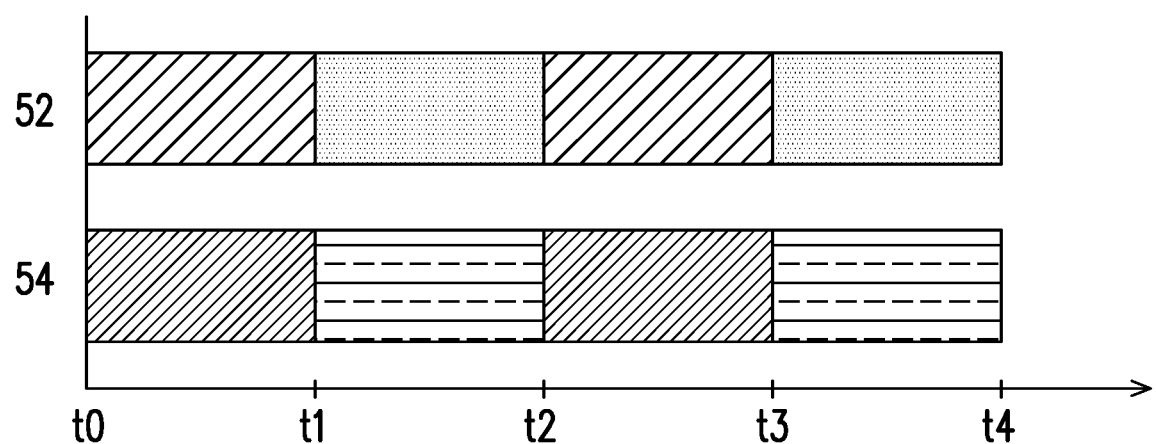

Referring to FIG. 6, FIG. 7C and FIG. 8C, a projection device 20 in the embodiment is shown in the above drawings. In the embodiment, the illumination system 100B has a first timing period (t0-t1 or t2-t3) and the second timing period (t1-t2 or t3-t4) in operation, and the blue light source 110 and the excitation light source 120 are changed between the on, off or power-saving state according to the timing periods respectively, such that the light beam (i.e., illumination beam LB provided by illumination system) that is changed according to timing periods is received by the first light valve 52 and the second light valve 54 as shown in FIG. 8C.

Specifically, at the first timing period (t0-t1 or t2-t3), the blue light source 110 is in the off state of the power-saving state, and the excitation beam L2 emitted by the excitation light source 120 passes through the first dichroic element 130 to the first converting section 142 of the wavelength converting element 140C to generate the excited beam L3 as shown in FIG. 7C. The excited beam L3 generated by the wavelength converting element 140C is transmitted to the first dichroic element 130 and reflected to pass through the diffusor 180 to generate the red light portion and green light portion (i.e., first red light beam L4 and green light beam L5) of the illumination beam LB. Thereafter, the red light portion and the green light portion of the illumination beam LB are transmitted to the dichroic mirror 80, the red light portion of the illumination beam LB passes through the dichroic mirror 80 and transmitted to the first light valve 52, and the green light portion of the illumination beam LB is reflected by the dichroic mirror 80 and transmitted to the second light valve 54 as shown in FIG. 8C.

At the second timing period (t1-t2 or t3-t4), the excitation light source 120 is in the on state, and the blue light source 110 is in the on state. The excitation beam L2 emitted by the excitation light source 120 passes through the first dichroic element 130 to the optical section 146A of the wavelength converting element 140C to generate another portion (i.e., third excited beam such as green light or cyan light) of the excited beam L3, and simultaneously transmitted to the diffusor 180 along with the blue light beam L1 emitted by the blue light source 110 to generate the blue light portion of the illumination beam LB, wherein the blue light beam L1 passes through the dichroic mirror 80 and transmitted to the first light valve 52, and another portion (i.e., third excited beam such as green light or cyan light) of the excited beam L3 is reflected by the dichroic mirror 80 and transmitted to the second light valve 54. The purpose of the embodiment is to adjust the color coordinate of blue light such that the color of the projection beam LP is more saturated to exhibit the real color of image.

Figure 9:
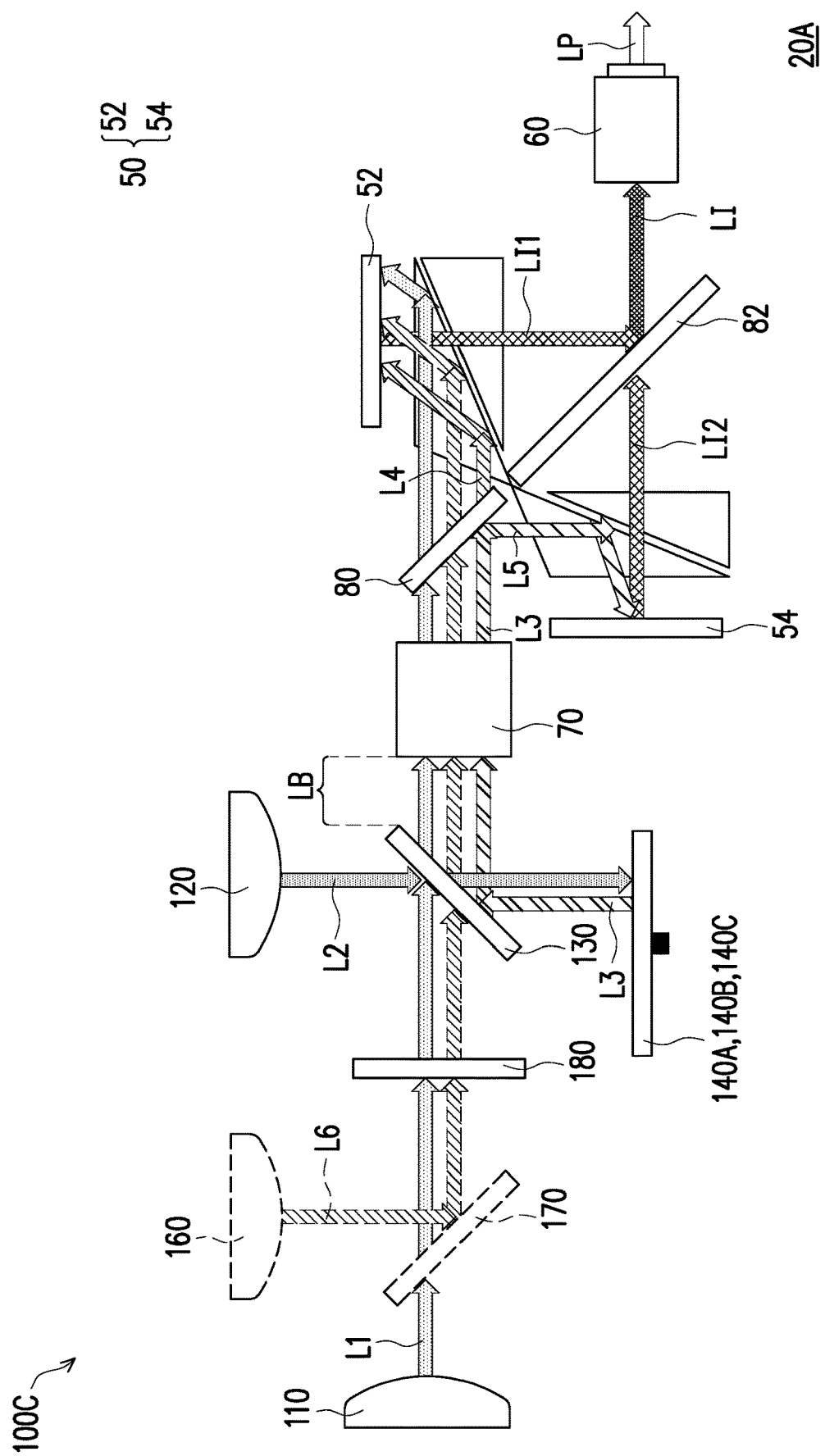
FIG. 9 is a schematic view of a projection device according to another embodiment of the disclosure.

FIG. 9 is a schematic view of a projection device according to another embodiment of the disclosure. Referring to FIG. 9, a projection device 20A in the embodiment is similar to the projection device 20 in FIG. 6, and the difference between the two is that, in the embodiment, the red light source 160 and the second dichroic element 170 of an illumination system 100C are disposed between the blue light source 110 and the first dichroic element 130. Accordingly, the second red light beam L6 provided by the red light source 160 is transmitted to the second dichroic element 170 and reflected to pass through the diffusor 180 and the first dichroic element 130, thereby providing the additional red light portion of the illumination beam LB. The diffusor 180 may be disposed between the second dichroic element 170 and the first dichroic element 130.

Figure 10:
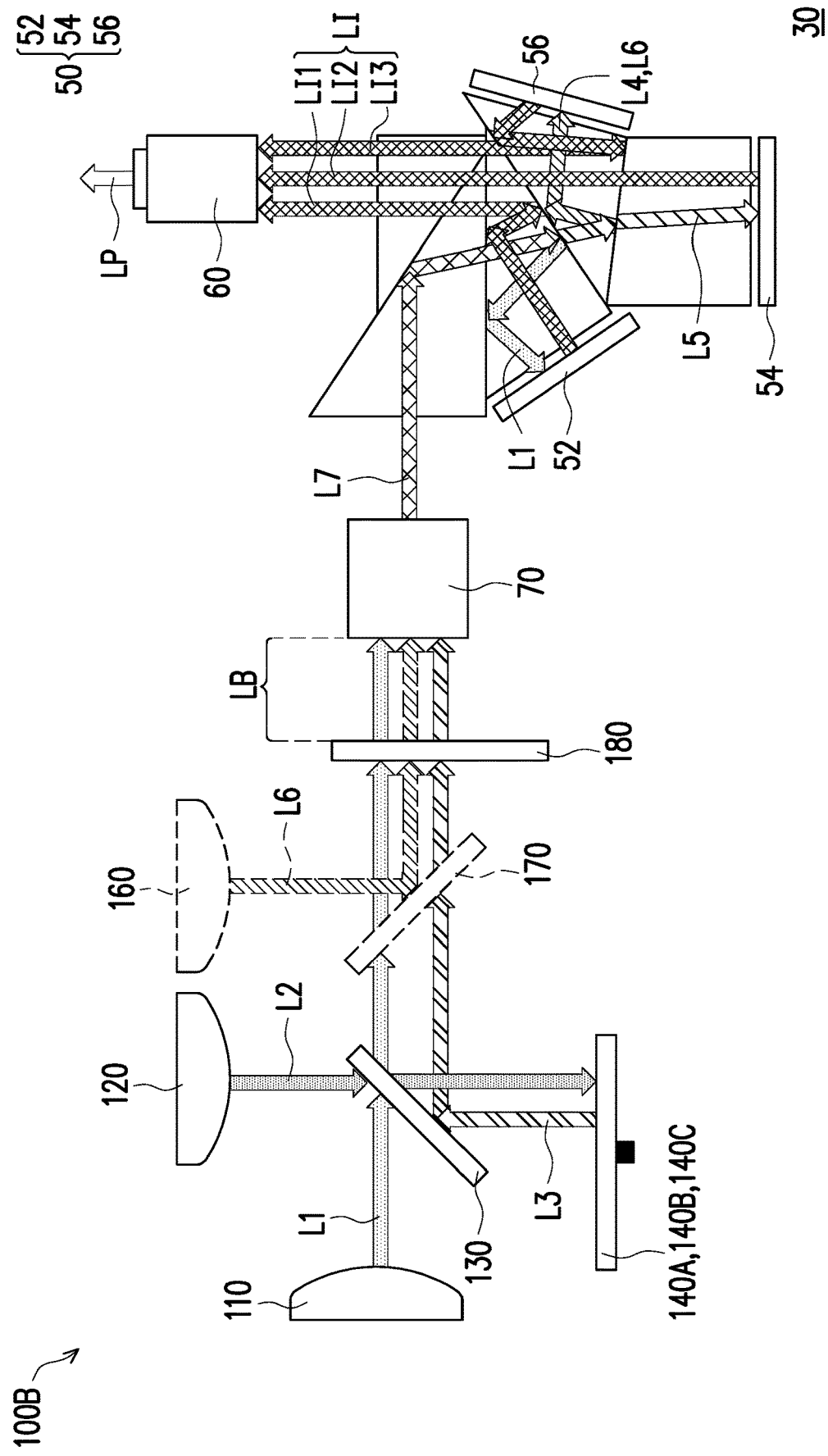
FIG. 10 is a schematic view of a projection device according to another embodiment of the disclosure.
Figure 11:
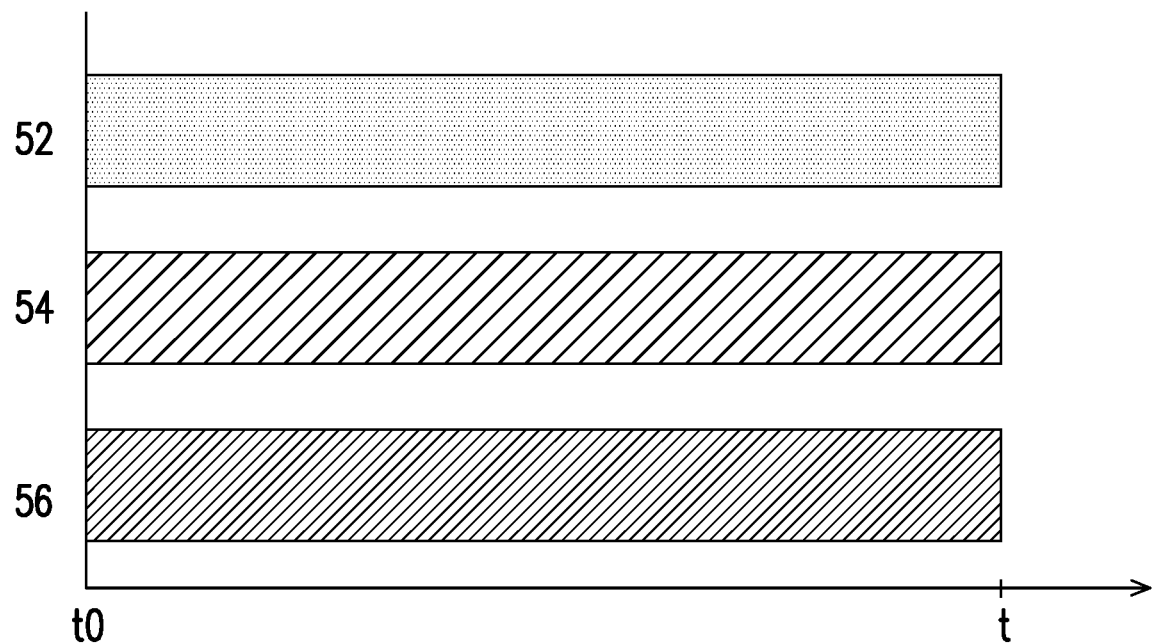
FIG. 11 is a timing period diagram showing the projection device in FIG. 10.

FIG. 10 is a schematic view of a projection device according to another embodiment of the disclosure. FIG. 11 is a timing period diagram showing the projection device in FIG. 10. Please referring to FIG. 10 and FIG. 11, a projection device 30 in the embodiment is similar to the projection device 20 in FIG. 6, and the difference between the two is that, in the embodiment, at least one light valve 50 of the projection device 30 includes the first light valve 52, the second light valve 54 and a third light valve 56, and is, for example, a projection device 30 using three digital micromirror devices. Additionally, in the embodiment, since the on, off or power-saving state of the blue light source 110 and the excitation light source 120 does not need to be changed according to different timing periods, that is, the blue light source 110 and the excitation light source 120 are simultaneously in the on, off or power-saving state, such that the light beam (i.e., illumination beam LB provided by illumination system) is received by the first light valve 52, the second light valve 54 and the third light valve 56 as shown in FIG. 11.

Therefore, the illumination beam LB provided by the illumination system 100B generates a mixing beam L7 after passing through the uniformizing element 70. The mixing beam L7 (e.g., white light) can be formed respectively through the dichroic function of different optical elements (e.g., dichroic prism) in the projection device 30, and provide the blue light beam L1, the green light beam L5 and the first red light beam L4 to the first light valve 52, the second light valve 54 and the third light valve 56 to be formed into the first sub-image beam LI1, the second sub-image beam LI2 and the third sub-image light LI3 by the first light valve 52, the second light valve 54 and the third light valve 56 respectively and transmitted to the lens module 60. Additionally, referring to FIG. 10, in the embodiment, the red light source 160 and the second dichroic element 170 as shown in FIG. 6 may be adapted in order to provide the projection beam LP having better color saturation and optical quality in the circumstances where color performance is emphasized (e.g., home theater circumstances). Details and implementation manners of the method for configuring the red light source 160 and the second dichroic element 170 to provide the second red light beam L6 in order to replace the first red light beam L4 in the excited beam L3 will be omitted since sufficient teachings, suggestions and descriptions of implementation can be obtained from common knowledge in the art.

Figure 12:
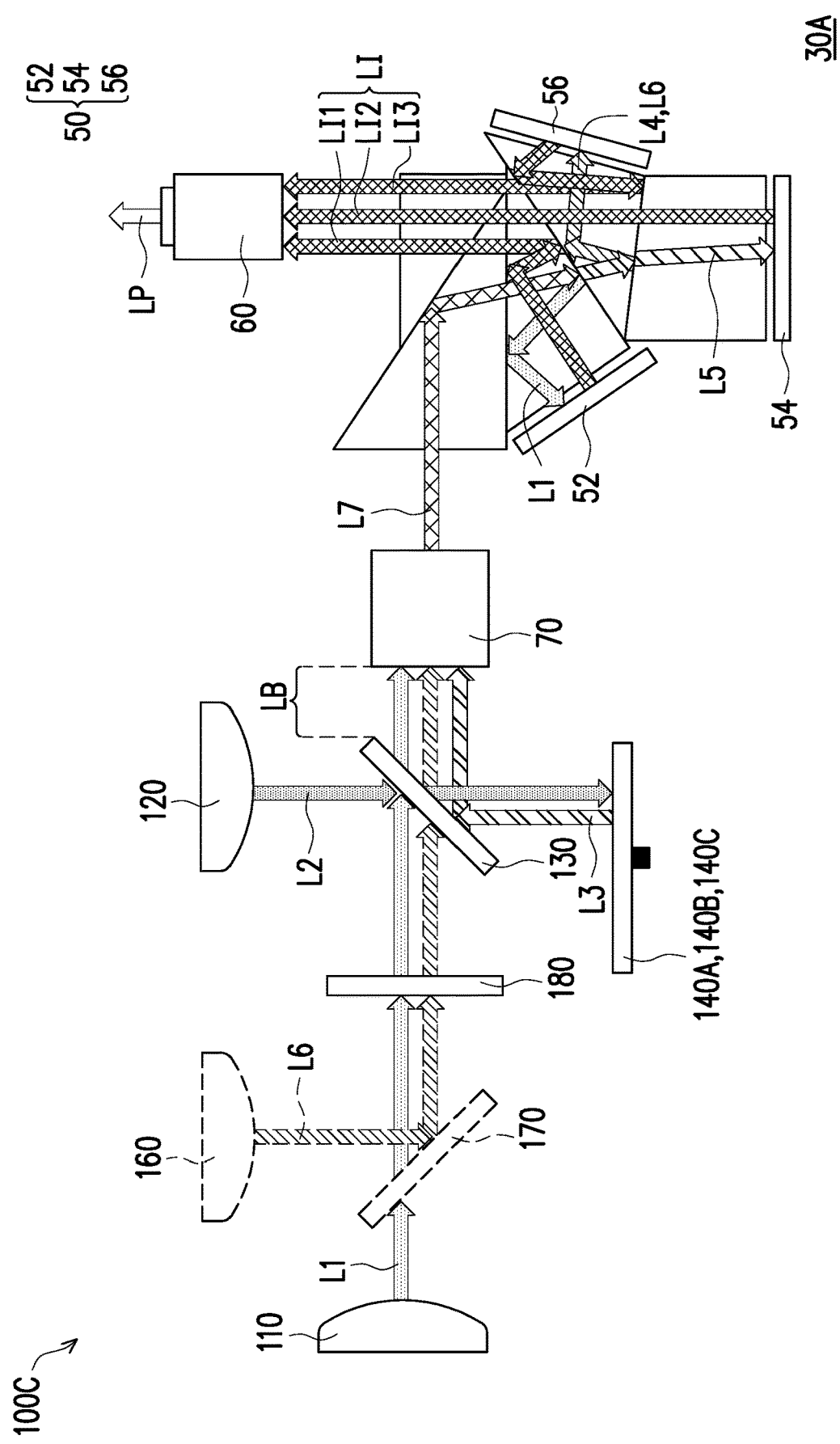
FIG. 12 is a schematic view of a projection device according to another embodiment of the disclosure.
Figure 13:
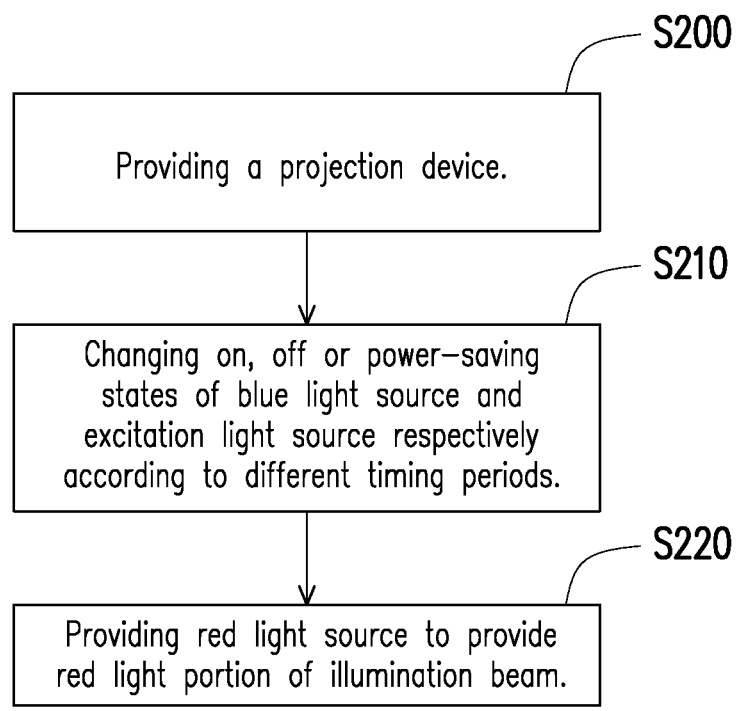
FIG. 13 is a flowchart of an operating method of a projection device according to an embodiment of the disclosure.

FIG. 12 is a schematic view of a projection device according to another embodiment of the disclosure. Referring to FIG. 12, a projection device 30A in the embodiment is similar to the projection device 30 in FIG. 10, and the difference between the two is that, in the embodiment, the red light source 160 and the second dichroic element 170 of the illumination system 100C are disposed between the blue light source 110 and the first dichroic element 130. Therefore, the second red light beam L6 provided by the red light source 160 is transmitted to the second dichroic element 170 and reflected to pass through the diffusor 180 and the first dichroic element 130, thereby providing additional red light portion of the illumination beam LB. The diffusor 180 is disposed between the second dichroic element 170 and the first dichroic element 130. FIG. 13 is a flowchart of an operating method of a projection device according to an embodiment of the disclosure. Referring to FIG. 13, the operating method in the embodiment is used for the projection device described in any one of the above embodiments, but the disclosure is not limited thereto. In the embodiment, in step S200, the projection device described in the above embodiment is provided, for example, a projection device having one light valve, two light valves and three light valves is provided. Next, in step S210, the on, off or power-saving state of the blue light source and excitation light source is changed respectively according to different timing periods. In other words, in the process of operating the projection device, the on, off or power-saving state of the blue light source and excitation light source is changed respectively according to a specific cycle. In this manner, the blue light source having longer wavelength may be used to provide the blue light portion of the illumination beam, and the excitation light source is used to provide the red light and green light portions of the illumination beam, thereby improving the problem of purple-like blue color in projection frame and enhancing optical quality of the projection beam of the projection device and saturation of image color. Additionally, in step S220, the red light source may further be added to provide additional red light portion of the illumination beam. In this manner, in the circumstances where color performance is emphasized (e.g., home theater circumstances), the projection beam provided by the projection device has better color saturation and optical quality.

Figure 14:
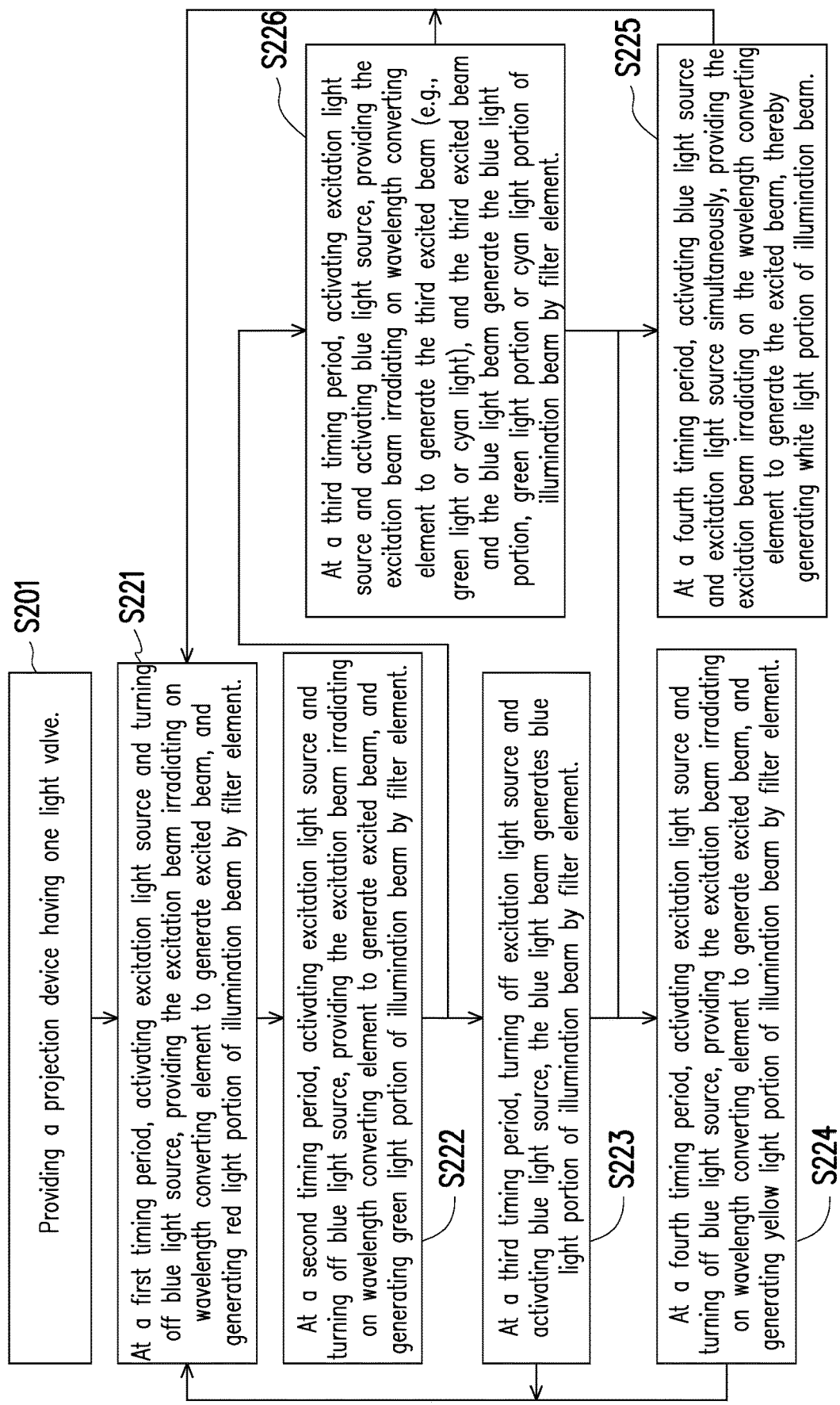
FIG. 14 is a flowchart of an operating method of a projection device according to another embodiment of the disclosure.

FIG. 14 is a flowchart of an operating method of a projection device according to another embodiment of the disclosure. More specifically, referring to FIG. 1, FIG. 2A, FIG. 3B, FIG. 13 and FIG. 14, in step S201, the number of light valve 50 in the projection device is one, which coordinates the wavelength converting element 140 and the filter element 150A, and a method of changing the blue light source and the excitation light source according to different timing periods may include: step S221, at the first timing period, the excitation light source 120 is activated and the blue light source 110 is turned off, the excitation beam L2 is irradiated on the wavelength converting element 140 to generate the excited beam L3, thereby generating the red light portion L4 of the illumination beam LB by the filter element 150; in step S222, at the second timing period, the excitation light source 120 is activated and the blue light source 110 is turned off, the excitation beam L2 is irradiated on the wavelength converting element 140 to generate the excited beam L3, thereby generating the green light portion L5 of the illumination beam LB by the filter element 150; and step S223, at the third timing period, the excitation light source 110 is turned off and the blue light source 120 is turned on, the blue light beam LI generates the blue light portion of the illumination beam LB by the filter element 150, thus exhibited according to the timing period as shown in FIG. 4C.

In other embodiments, referring to FIG. 1, FIG. 2A, FIG. 3A and FIG. 13, if the number of the light valve 50 in the projection device is one, the wavelength converting element 140 and the filter element 150 are used for coordination. The fourth timing period is added, in step S224, at the fourth timing period, the excitation light source 110 is activated and the blue light source 120 is turned off. The excitation beam L2 is irradiated on the wavelength converting element 140 to generate the excited beam L3. The yellow light portion of the illumination beam LB is generated by the filter element 150, thus exhibited according to the timing period as shown in FIG. 4A. Additionally, in one embodiment, in step S225, the blue light source and the excitation light source are activated simultaneously at the fourth timing period to generate the white light portion of the illumination beam LB, thus exhibited according to the timing period as shown in FIG. 4B.

In other embodiments, referring to FIG. 1, FIG. 2B, FIG. 3A, FIG. 3B and FIG. 13, if the number of the light valve 50 in the projection device is one, the wavelength converting element 140A and the filter element 150 or filter element 150A are used for coordination. The optical section 146A of the wavelength converting element 140A further includes a wavelength converting material, and the diffusion section 156 of filter assembly (150, 150A) may further include a filter coating. The method for changing the blue light source and excitation light source according to different timing periods may include: step S226, at the third timing period, the excitation light source 110 is activated and the blue light source 120 is activated. The excitation beam L2 is irradiated on the wavelength converting element 140 to generate the third excited beam (e.g., green light or cyan light). The third excited beam and the blue light beam L1 generate the blue light, green light or cyan light portion of the illumination beam LB by the filter element (150, 150A), but the disclosure is not limited thereto.

It should be indicated that, in the above embodiments, the method for changing the blue light source and excitation light source according to different timing periods further includes: step S227, at the third timing period, the intensity of the activated excitation light source 110 and the intensity of the activated blue light source 120 are the same, that is, the intensity of the excitation beam L2 and the intensity of the blue light beam L1 are the same, e.g., the intensity is the same as current or voltage. The wavelength converting element 140A having the optical section 146A with wavelength converting material is provided, wherein the wavelength converting material in the optical section 146A has the same concentration as the wavelength converting material in the second converting section 144. In other embodiments, at the third timing period, the intensity of the activated excitation light source 110 and the intensity of the activated blue light source 120 are the same. The wavelength converting element 140A having the optical section 146A with wavelength converting material is provided, wherein the concentration of wavelength converting material in the optical section 146A is different from the wavelength converting material in the second converting section 144. Or, in other embodiments, the method for changing the blue light source and the excitation light source according to different timing periods further includes: step S228, the intensity of the activated excitation light source 110 and the intensity of the activated blue light source 120 are different. The wavelength converting element 140A having the optical section 146A with the wavelength converting material is provided, wherein the wavelength converting material in the optical section 146A has the same concentration as the wavelength converting material in the second converting section 144.

Figure 15:
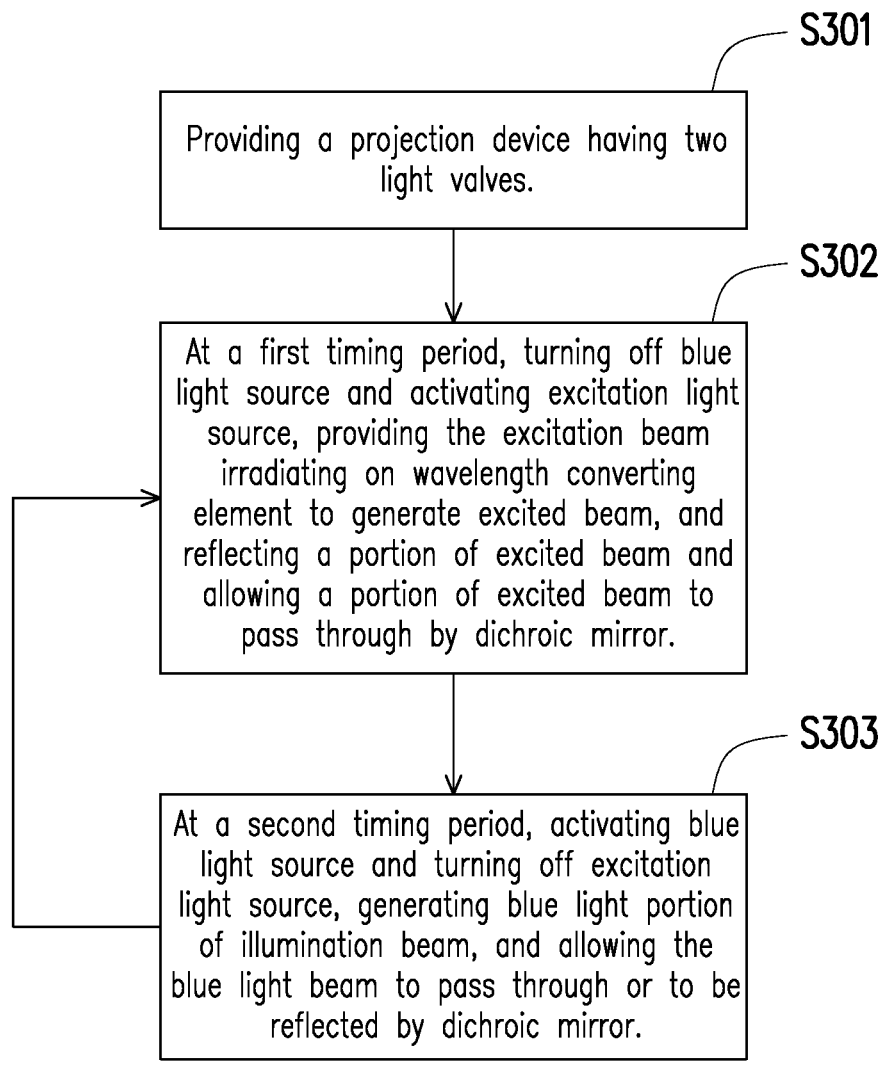
FIG. 15 is a flowchart of an operating method of a projection device according to yet another embodiment of the disclosure.

FIG. 15 is a flowchart of an operating method of a projection device according to yet another embodiment of the disclosure. For example, referring to FIG. 6, FIG. 7A, FIG. 7B, FIG. 8A, FIG. 8B, FIG. 13 and FIG. 15, in step S301, if the number of light valve (52, 54) in the projection device is two, the method for changing the blue light source and the excitation light source according to different timing periods may include: step S302, at the first timing period, the excitation light source 120 is activated and the blue light source 110 is turned off. The excitation beam L2 is irradiated on the wavelength converting element (140A, 140B) to generate the excited beam L3, and the dichroic mirror 80 is used to reflect a portion of the excited beam L3 and allows a portion of the excited beam L3 to pass through. In other words, the dichroic mirror 80 is used to allow the red light beam L4 of the excited beam L3 to pass through and reflect the green light beam L5 of the excited beam L3, but the disclosure is not limited thereto. In other embodiments, the dichroic mirror 80 reflects the red light beam L4 of the excited beam L3 and allows the green light beam L5 of the excited beam L3. In step S303, at the second timing period, the blue light source 110 is activated and the excitation light source 120 is turned off, thereby generating the blue light portion of the illumination beam; the dichroic mirror 80 is used to allow the blue light beam LI to pass through, but the disclosure is not limited thereto. In other embodiments, the dichroic mirror 80 is used to reflect the blue light beam L1.

As the timing period shown in FIG. 8C, additionally, referring to FIG. 6, FIG. 7C, FIG. 8C and FIG. 13, in one embodiment, it is also possible to activate the blue light source 110 and excitation light source 120 at the second timing period, and the wavelength converting element 140C in FIG. 7C is used for coordination to simultaneously generate the blue light portion of the illumination beam and the green light or cyan light portion of the excited beam, but the disclosure is not limited thereto. In this manner, the problem of purple-like blue light in the projection frame may be improved, thereby enhancing optical quality of projection beam of projection device and saturation of image color.

Figure 16:
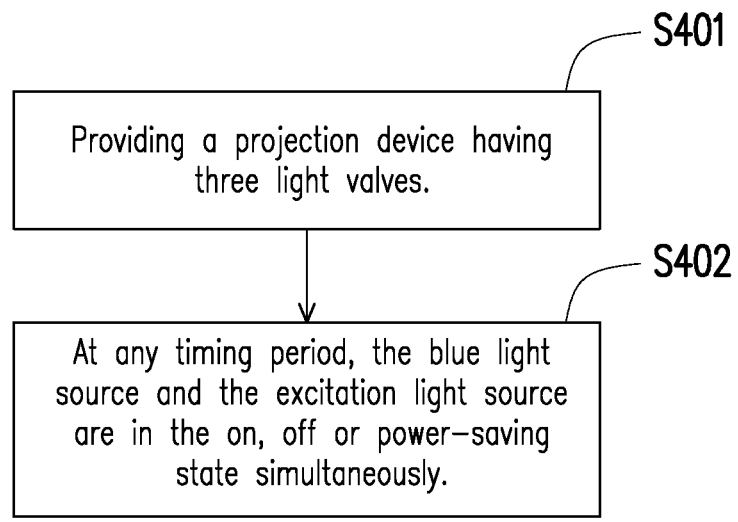
FIG. 16 is a flowchart of an operating method of a projection device according to still another embodiment of the disclosure.

FIG. 16 is a flowchart of an operating method of a projection device according to still another embodiment of the disclosure. For example, referring to FIG. 10, FIG. 7A, FIG. 7B, FIG. 7C, FIG. 13 and FIG. 16, in step S401, the number of the light valve 50 in the projection device is three, and the wavelength converting assembly (140A, 140B, 140C) is used for coordination. The method for changing the blue light source and the excitation light source according to different timing periods may include: the on, off or power-saving state of the blue light source 110 and the excitation light source 120 does not need to be changed according to different timing periods; in step S402, the blue light source 110 and the excitation light source 120 are in the on, off or power-saving state simultaneously, such that the light beam (i.e., illumination beam LB provided by illumination system) is received by the first light valve 52, the second light valve 54 and the third light valve 56 as shown in FIG. 11.

In summary, the embodiments of the disclosure at least have one of the following advantages or effects. In the embodiments of the disclosure, the illumination system uses blue light source to provide the blue light portion of the illumination beam and uses excitation light source to provide the red light portion and green light portion of the illumination beam. Accordingly, the blue light source having longer wavelength may improve the purple-like blue color in the projection frame, thereby enhancing the optical quality of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An illumination system, comprising:
a blue light source, adapted to provide a blue light beam,
an excitation light source, adapted to provide an excitation beam;
a first dichroic element, disposed on transmitting paths of the blue light beam and the excitation beam;
a wavelength converting element, disposed on the transmitting path of the excitation beam, and adapted to convert the excitation beam into an excited beam, wherein the excitation beam passes through the first dichroic element to the wavelength converting element and is converted into the excited beam, the excited beam is transmitted to the first dichroic element and reflected, a wavelength of the blue light beam is greater than a wavelength of the excitation beam, and the blue light source and the excitation light source are disposed on the same side of the first dichroic element; and
a filter element, disposed on the transmitting paths of the blue light beam and the excited beam, the filter element comprising a first filter section, a second filter section and a diffusion section, wherein at a first timing period, the blue light source is in an off state or a power-saving state, the excitation beam is transmitted to a first converting section of the wavelength converting element to be converted into a first exited beam, and the first excited beam passes through the first filter section to generate a first red light beam, at a second timing period, the blue light source is in the off state or the power-saving state, the excitation beam is transmitted to a second converting section of the wavelength converting element to be converted into a second excited beam, and the second excited beam passes through the second filter section to generate a green light beam, at a third timing period, the excitation light source is in the off state or the power-saving state, and the blue light beam passes through the diffusion section, wherein the excited beam comprises the first excited beam and the second excited beam.

2. The illumination system of claim 1, further comprising:

a red light source, adapted to provide a second red light beam; and a second dichroic element, disposed on transmitting paths of the blue light beam and the second red light beam, wherein the red light source is activated at the first timing period, and the second red light beam is transmitted to the second dichroic element and reflected to the first filter section of the filter element.

3. The illumination system of claim 2, wherein the red light source and the second dichroic element are disposed between the blue light source and the first dichroic element.

4. The illumination system of claim 2, wherein the first dichroic element and the second dichroic element are disposed in a non-parallel manner, an included angle is formed between an extending line of the first dichroic element and an extending line of the second dichroic element.

5. The illumination system of claim 1, wherein the filter element further comprises a light-transmissible section, at a fourth timing period, the excitation beam passes through the first dichroic element to the first converting section of the wavelength converting element and is converted into the excited beam, and the excited beam passes through the light-transmissible section.

6. The illumination system of claim 1, wherein the blue light beam is a blue light beam having a wavelength of 460 nm, and the excitation light beam is a blue light beam having a wavelength of 445 nm.

7. The illumination system of claim 1, wherein the blue light source and the wavelength converting element are disposed on opposite sides of the first dichroic element respectively.

8. An illumination system, comprising:
a blue light source, adapted to provide a blue light beam;
an excitation light source, adapted to provide an excitation beam;
a first dichroic element, disposed on transmitting paths of the blue light beam and the excitation beam; and
a wavelength converting element, disposed on the transmitting path of the excitation beam, and adapted to convert the excitation beam into an excited beam, wherein the excitation beam passes through the first dichroic element to the wavelength converting element and is converted into the excited beam, the excited beam is transmitted to the first dichroic element and reflected, a wavelength of the blue light beam is greater than a wavelength of the excitation beam, and the blue light source and the excitation light source are disposed on the same side of the first dichroic element,
wherein the wavelength converting element further comprises an optical section, the optical section does not receive the excitation beam.

9. An illumination system, comprising:
a blue light source, adapted to provide a blue light beam;
an excitation light source, adapted to provide an excitation beam;
a first dichroic element, disposed on transmitting paths of the blue light beam and the excitation beam; and
a wavelength converting element, disposed on the transmitting path of the excitation beam, and adapted to convert the excitation beam into an excited beam, wherein the excitation beam passes through the first dichroic element to the wavelength converting element and is converted into the excited beam, the excited beam is transmitted to the first dichroic element and reflected, a wavelength of the blue light beam is greater than a wavelength of the excitation beam, and the blue light source and the excitation light source are disposed on the same side of the first dichroic element,
wherein the wavelength converting element further comprises an optical section, the optical section has a wavelength converting material.

10. The illumination system of claim 9, further comprising:
a filter element, disposed on the transmitting paths of the blue light beam and the excitation beam, the filter element comprising a first filter section, a second filter section and a diffusion section, wherein at a first timing period, the blue light source are in an off state or a power-saving state, the excitation beam is transmitted to a first converting section of the wavelength converting element to be converted into a first excited beam, and the first excited beam passes through the first filter section to generate a first red light beam, at a second timing period, the blue light source is in the off state or the power-saving state, the excitation beam is transmitted to a second converting section of the wavelength converting element to be converted into a second excited beam, and the second excited beam passes through the second filter section to generate a green light beam, at a third timing period, the excitation light source is in an on state, the blue light source is activated, the excitation beam passes through the first dichroic element to the optical section of the wavelength converting element to generate a third excited beam, and is simultaneously transmitted to the diffusion section along with the blue light beam and passes through the diffusion section.

11. The illumination system of claim 9, further comprising:
a diffusor, disposed on the transmitting path of the blue light beam, wherein at a first timing period, the blue light source is in an off state or a power-saving state, the excitation beam passes through the first dichroic element to a first converting section of the wavelength converting element and converted into the excited beam, and the excited beam is transmitted to the first dichroic element to be reflected to the diffusor, at a second timing period, the excitation light source is in an on state, and the blue light source is in an on state, the excitation beam passes through the first dichroic element to the optical section of the wavelength converting element and is converted into a third excited beam, and the third excited beam is transmitted to the first dichroic element and reflected to the diffusor, the blue light beam passes through the first dichroic element and transmitted to the diffusor.

12. An illumination system, comprising:
a blue light source, adapted to provide a blue light beam;
an excitation light source, adapted to provide an excitation beam;
a first dichroic element, disposed on transmitting paths of the blue light beam and the excitation beam;
a wavelength converting element, disposed on the transmitting path of the excitation beam, and adapted to convert the excitation beam into an excited beam, wherein the excitation beam passes through the first dichroic element to the wavelength converting element and is converted into the excited beam, the excited beam is transmitted to the first dichroic element and reflected, a wavelength of the blue light beam is greater than a wavelength of the excitation beam, and the blue light source and the excitation light source are disposed on the same side of the first dichroic element, a diffusor, disposed on the transmitting path of the blue light beam, wherein at a first timing period, the blue light source is in an off state or a power-saving state, the excitation beam passes through the first dichroic element to a first converting section of the wavelength converting element and converted into the excited beam, and the excited beam is transmitted to the first dichroic element and reflected to the diffusor, at a second timing period, the excitation light source is in an off state or a power-saving state, the blue light beam passes through the first dichroic element and the diffusor, wherein the excited beam comprises a first red light beam and a green light beam;

a red light source, adapted to provide a second red light beam; and a second dichroic element, disposed on the transmitting paths of the blue light beam and the second red light beam, wherein the red light source is activated at the first timing period, and the second red light beam is transmitted to the second dichroic element to be reflected to the diffusor.

13. The illumination system to claim 12, wherein the wavelength converting element further comprises an optical section, the optical section does not receive the excitation beam.

14. The illumination system of claim 12, wherein the red light source and the second dichroic element are disposed between the diffusor and the first dichroic element.

15. The illumination system of claim 12, wherein the red light source, the second dichroic element and the diffusor are disposed between the blue light source and the first dichroic element.

16. An illumination system, comprising:
a blue light source, adapted to provide a blue light beam;
an excitation light source, adapted to provide an excitation beam;
a first dichroic element, disposed on transmitting paths of the blue light beam and the excitation beam; and
a wavelength converting element, disposed on the transmitting path of the excitation beam, and adapted to convert the excitation beam into an excited beam, wherein the excitation beam passes through the first dichroic element to the wavelength converting element and is converted into the excited beam, the excited beam is transmitted to the first dichroic element and reflected, a wavelength of the blue light beam is greater than a wavelength of the excitation beam, and the blue light source and the excitation light source are disposed on the same side of the first dichroic element,
wherein the excited beam comprises a first red light beam and a green light beam, the illumination system further comprising:
a red light source, adapted to provide a second red light beam;
a diffusor, disposed on transmitting paths of the blue light beam and the second red light beam; and
a second dichroic element, disposed on the transmitting paths of the blue light beam and the second red light beam, and disposed between the blue light source and the diffusor, wherein the blue light source, the excitation light source and the red light source are simultaneously in an on state, an off state or a power-saving state.

17. A projection device, adapted to provide a projection beam, the projection device comprising:
an illumination system, adapted to provide an illumination beam, the illumination system comprising:
a blue light source, adapted to provide a blue light beam;
an excitation light source, adapted to provide an excitation beam;
a first dichroic element, disposed on transmitting paths of the blue light beam and the excitation beam; and
a wavelength converting element, disposed on the transmitting path of the excitation beam, adapted to convert the excitation beam into an excited beam, the excitation beam passing through the first dichroic element to the wavelength converting element and converted into the excited beam, the excited beam transmitted to the first dichroic element and reflected;
at least one light valve, disposed on a transmitting path of the illumination beam, adapted to convert the illumination beam into at least one image beam; and
a lens module, disposed on a transmitting path of the at least one image beam, adapted to form the at least one image beam into the projection beam, wherein a wavelength of the blue light beam is greater than a wavelength of the excitation beam, and the blue light source and the excitation light source are disposed on the same side of the first dichroic element,
wherein the number of the at least one light valve is one, the illumination system further comprising a filter element, disposed on the transmitting paths of the blue light beam and the excited beam, the filter element comprising a first filter section, a second filter section and a diffusion section, wherein at a first timing period, the blue light source is in an off state or a power-saving state, the excitation beam is transmitted to a first converging section of the wavelength converting element to be converted into a first excited beam, and the first excited beam passes through the first filter section and generate a first red light beam, at a second timing period, the blue light source is in the off state or the power-saving state, the excitation beam is transmitted to a second converting section of the wavelength converting element and converted into a second excited beam, and the second excited beam passes through the second filter section and generate a green light beam, at a third timing period, the excitation light source is in the off state or the power-saving state, and the blue light beam passes through the diffusion section, wherein the excited beam comprises the first excited beam and the second excited beam.

18. The projection device of claim 17, wherein the illumination system further comprises a red light source and a second dichroic element, the red light source is adapted to provide a second red light beam, the second dichroic element is disposed on transmitting paths of the blue light beam and the second red light beam, wherein the red light source is activated at the first timing period, and the second red light beam is transmitted to the second dichroic element and reflected to the first filter section of the filter element.

19. The projection device of claim 18, wherein the red light source and the second dichroic element are disposed between the blue light source and the first dichroic element.

20. The projection device of claim 17, wherein the filter element further comprises a light-transmissible section, at a fourth timing period, the excitation beam passes through the first dichroic element to the first converting section of the wavelength converting element and converted into the first excited beam, and the first excited beam passes through the light-transmissible section.

21. The projection device of claim 17, wherein the wavelength converting element further comprises an optical section, the optical section does not receive the excitation beam.

22. The projection device of claim 17, wherein the wavelength converting element further comprises an optical section, the optical section has a wavelength converting material.

23. The projection device of claim 22, wherein the illumination system further comprises a diffusor, disposed on a transmitting path of the blue light beam, wherein at a first timing period, the blue light source is in an off state or a power-saving state, the excitation beam passes through the first dichroic element to a first converting section of the wavelength converting element and converted into the excited beam, and the excited beam is transmitted to the first dichroic element to be reflected to the diffusor, at a second timing period, the excitation light source is in an on state, and the blue light source is in the on state, the excitation beam passes through the first dichroic element to the optical section of the wavelength converting element and converted into a third excited beam, and the third excited beam is transmitted to the first dichroic element and reflected to the diffusor, the blue light beam passes through the first dichroic element and transmitted to the diffusor.

24. The projection device of claim 17, further comprising:
a uniformizing element, disposed on transmitting paths of the blue light beam and the excited beam.

25. An operating method of a projection device, comprising:
providing the projection device as claimed in claim 17; and
changing an on, off, or power-saving state of the blue light source and the excitation light source respectively according to different timing periods, wherein at a first timing period, the on, off or power-saving states of the blue light source and the excitation light source are different.

26. An operating method of a projection device, wherein the projection device is adapted to provide a projection beam, and the projection device comprises:
an illumination system, adapted to provide an illumination beam, the illumination system comprising:
a blue light source, adapted to provide a blue light beam;
an excitation light source, adapted to provide an excitation beam;
a first dichroic element, disposed on transmitting paths of the blue light beam and the excitation beam; and
a wavelength converting element, disposed on the transmitting path of the excitation beam, adapted to convert the excitation beam into an excited beam, the excitation beam passing through the first dichroic element to the wavelength converting element and converted into the excited beam, the excited beam transmitted to the first dichroic element and reflected;
at least one light valve, disposed on a transmitting path of the illumination beam, adapted to convert the illumination beam into at least one image beam; and
a lens module, disposed on a transmitting path of the at least one image beam, adapted to form the at least one image beam into the projection beam, wherein a wavelength of the blue light beam is greater than a wavelength of the excitation beam, and the blue light source and the excitation light source are disposed on the same side of the first dichroic element,
the method comprising:
providing the projection device; and
changing an on, off, or power-saving state of the blue light source and the excitation light source respectively according to different timing periods, wherein at a first timing period, the on, off or power-saving states of the blue light source and the excitation light source are different,
wherein the number of the at least one light valve is two, and the step of changing the on, off or power-saving states of the blue light source and the excitation light source respectively according to different timing periods further comprising:
at a first timing period, turning off or changing to the power-saving state of the blue light source and activating the excitation light source, thereby generating a red light portion and a green light portion of the illumination beam; and
at a second timing period, activating the blue light source and turning off or changing to the power-saving state of the excitation light source, thereby generating a blue light portion of the illumination beam.

27. An operating method of a projection device, wherein the projection device is adapted to provide a projection beam, and the projection device comprises:
an illumination system, adapted to provide an illumination beam, the illumination system comprising:
a blue light source, adapted to provide a blue light beam;
an excitation light source, adapted to provide an excitation beam;
a first dichroic element, disposed on transmitting paths of the blue light beam and the excitation beam; and
a wavelength converting element, disposed on the transmitting path of the excitation beam, adapted to convert the excitation beam into an excited beam, the excitation beam passing through the first dichroic element to the wavelength converting element and converted into the excited beam, the excited beam transmitted to the first dichroic element and reflected;
at least one light valve, disposed on a transmitting path of the illumination beam, adapted to convert the illumination beam into at least one image beam; and
a lens module, disposed on a transmitting path of the at least one image beam, adapted to form the at least one image beam into the projection beam, wherein a wavelength of the blue light beam is greater than a wavelength of the excitation beam, and the blue light source and the excitation light source are disposed on the same side of the first dichroic element,
the method comprising:
providing the projection device; and
changing an on, off, or power-saving state of the blue light source and the excitation light source respectively according to different timing periods, wherein at a first timing period, the on, off or power-saving states of the blue light source and the excitation light source are different,
wherein the number of the at least one light valve is two, and the step of changing the on, off or power-saving states of the blue light source and the excitation light source respectively according to different timing periods further comprising:
at a first timing period, turning off or changing to the power-saving state of the blue light source and activating the excitation light source, thereby generating a red light portion and a green light portion of the illumination beam; and at a second timing period, simultaneously activating the blue light source and the excitation light source, thereby generating a blue light portion of the illumination beam and a green light portion of the illumination beam or a cyan light portion of the illumination beam.

28. An operating method of a projection device, wherein the projection device is adapted to provide a projection beam, and the projection device comprises:
an illumination system, adapted to provide an illumination beam, the illumination system comprising:
a blue light source, adapted to provide a blue light beam;
an excitation light source, adapted to provide an excitation beam;
a first dichroic element, disposed on transmitting paths of the blue light beam and the excitation beam; and
a wavelength converting element, disposed on the transmitting path of the excitation beam, adapted to convert the excitation beam into an excited beam, the excitation beam passing through the first dichroic element to the wavelength converting element and converted into the excited beam, the excited beam transmitted to the first dichroic element and reflected;

at least one light valve, disposed on a transmitting path of the illumination beam, adapted to convert the illumination beam into at least one image beam; and a lens module, disposed on a transmitting path of the at least one image beam, adapted to form the at least one image beam into the projection beam, wherein a wavelength of the blue light beam is greater than a wavelength of the excitation beam, and the blue light source and the excitation light source are disposed on the same side of the first dichroic element, the method comprising:

providing the projection device; and changing an on, off, or power-saving state of the blue light source and the excitation light source respectively according to different timing periods, wherein at a first timing period, the on, off or power-saving states of the blue light source and the excitation light source are different, wherein the number of the at least one light valve is three, and the step of changing the on, off or power-saving states of the blue light source and the excitation light source respectively according to different timing periods further comprising:

simultaneously activating the excitation light source and the blue light source, thereby generating a blue light portion, a red light portion and a green light portion of the illumination beam.

* * * * *